(12) United States Patent
Pelletier

(10) Patent No.: US 6,536,104 B2
(45) Date of Patent: Mar. 25, 2003

(54) METHOD OF FABRICATING AND A METHOD OF RENOVATING AN ELECTRICAL POWER SUPPLY RAIL, A CARRIAGE FOR CARRYING OUT THE METHODS, A RAIL MOUNTING BODY AND A RAIL WEAR PLATE FOR USE IN THE FABRICATION METHOD, AND AN ELECTRICAL POWER SUPPLY RAIL OBTAINED BY THE METHOD

(75) Inventor: Yves Pelletier, Lavilletertre (FR)

(73) Assignee: Railtech International (FR)

( * ) Notice: Subject to any disclaimer, the term of this patent is extended or adjusted under 35 U.S.C. 154(b) by 153 days.

(21) Appl. No.: 09/759,291

(22) Filed: Jan. 10, 2001

(65) Prior Publication Data

US 2002/0088680 A1 Jul. 11, 2002

(51) Int. Cl.$^7$ .................................................. H05K 3/20
(52) U.S. Cl. .................................... 29/831; 191/22 DM
(58) Field of Search ........................ 191/22 DM, 22 R, 191/33 PM; 238/151; 29/825, 432, 525, 428, 831

(56) References Cited

U.S. PATENT DOCUMENTS

| 3,733,696 A | 5/1973 | Scofield et al. |
| 3,885,655 A | 5/1975 | Corl et al. |
| 5,161,667 A | 11/1992 | Kilburg |

FOREIGN PATENT DOCUMENTS

FR  2 227 148  11/1974

*Primary Examiner*—Edward K. Look
*Assistant Examiner*—Kimya N McCoy
(74) *Attorney, Agent, or Firm*—Blakely Sokoloff Taylor & Zafman

(57) ABSTRACT

The present invention concerns the fabrication of a longitudinal rail for supplying electrical power to a mobile, the rail including a mounting body for mounting the rail on a support and a wear plate which is worn by the mobile. The mounting body has a rigid base and a head divided into two halves which are prestressed in elastic flexing between rims of the wear plate. Applications include the production of electrical power supply rails for rail vehicles or materials handling plant.

50 Claims, 8 Drawing Sheets

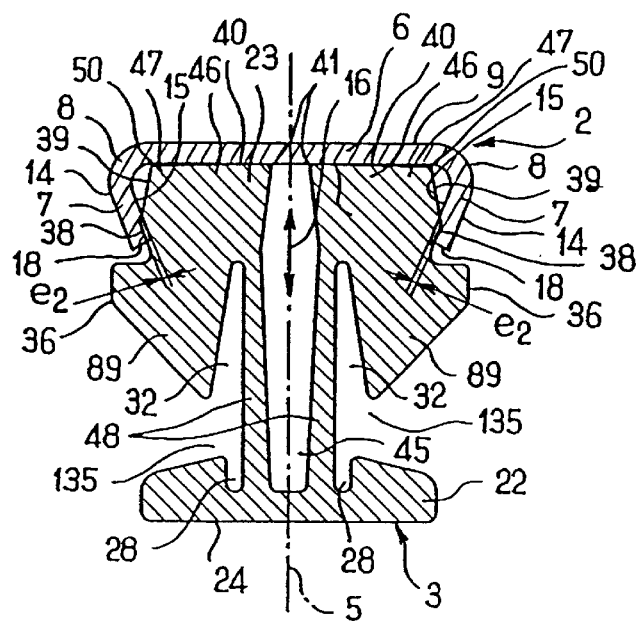
FIG_5
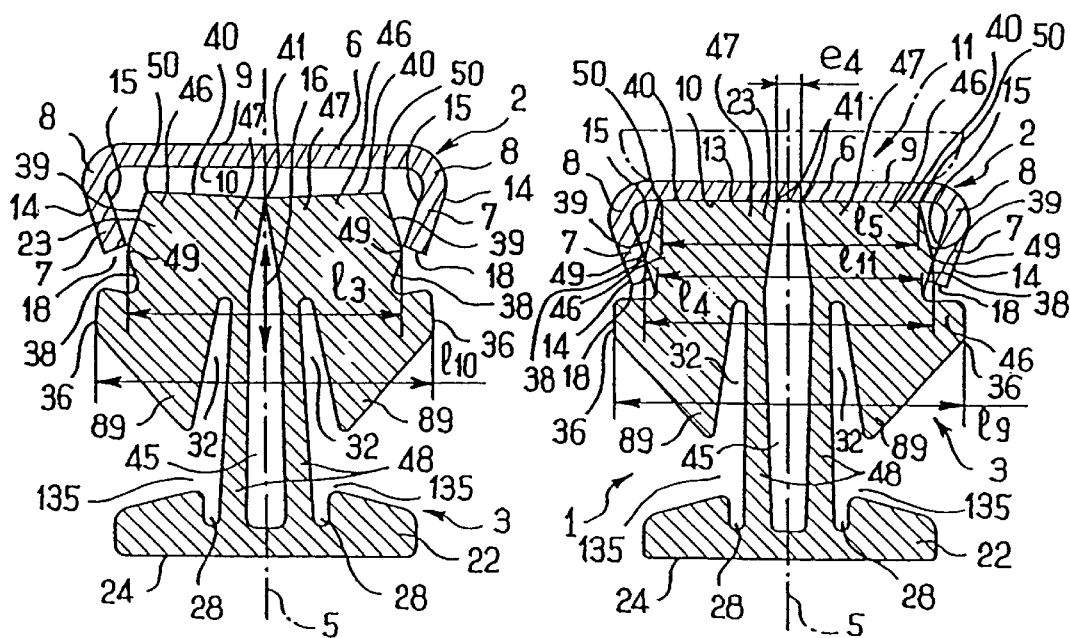
FIG_6  FIG_7

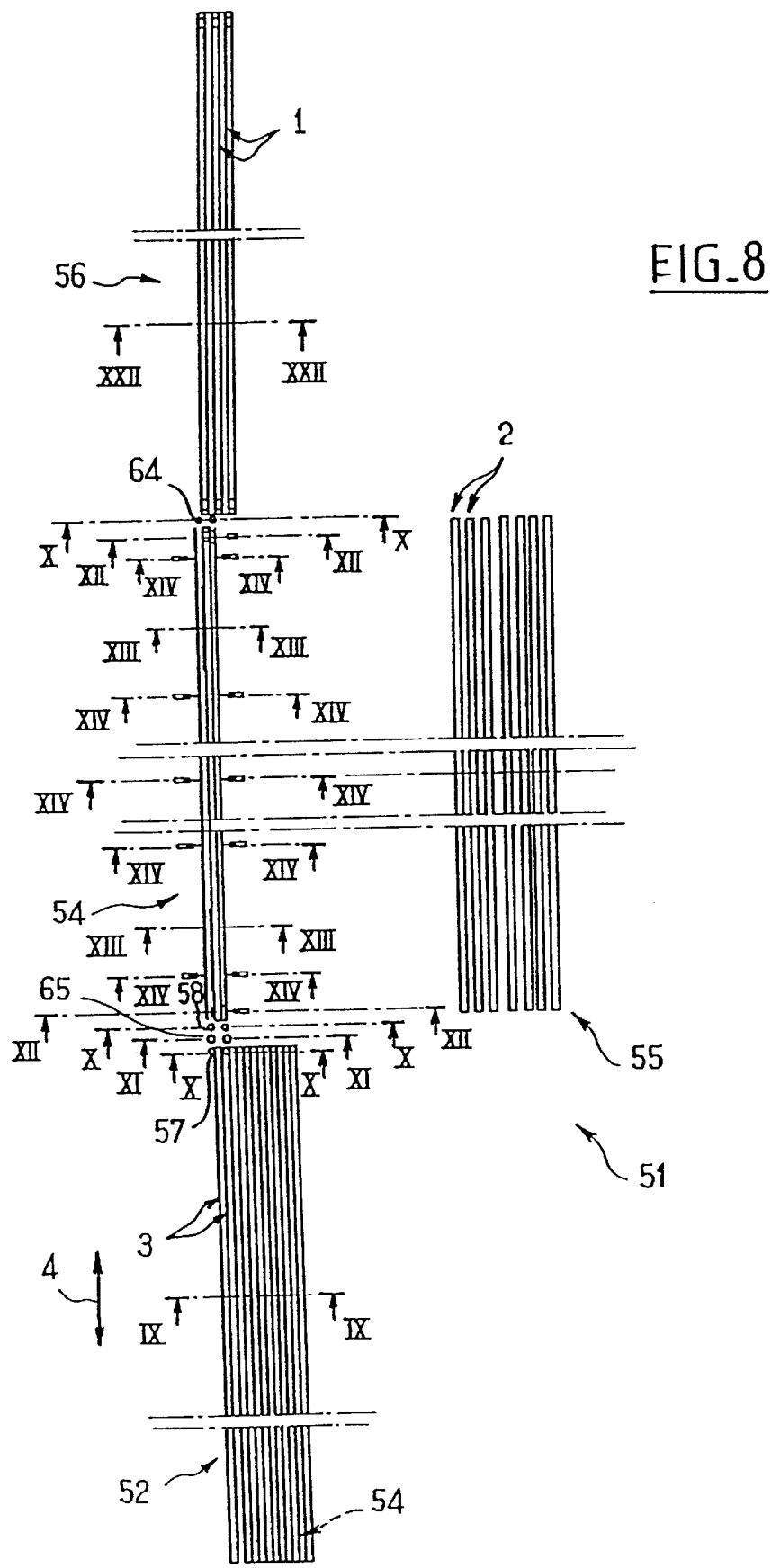
FIG_8

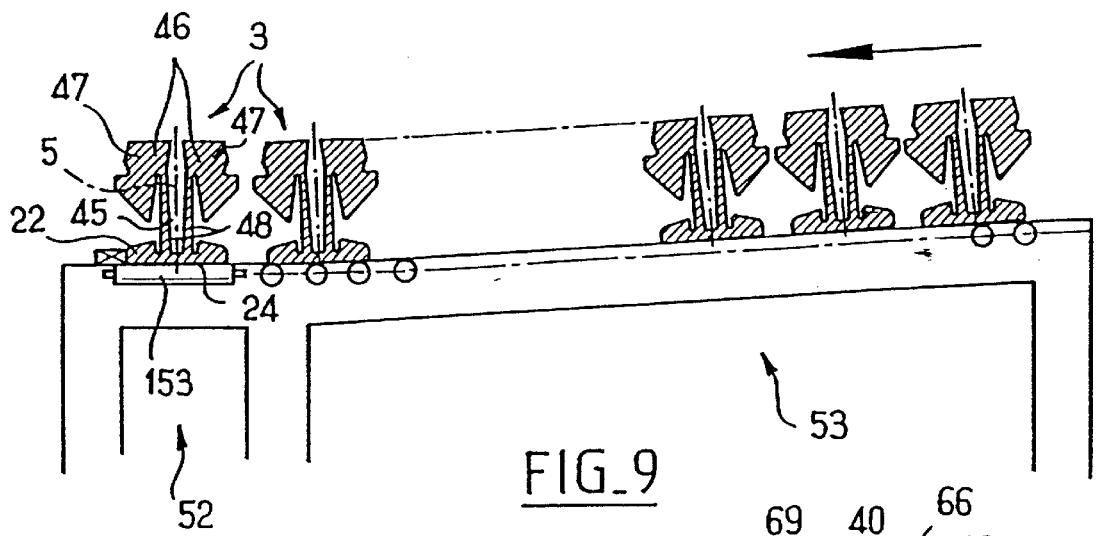
FIG_9
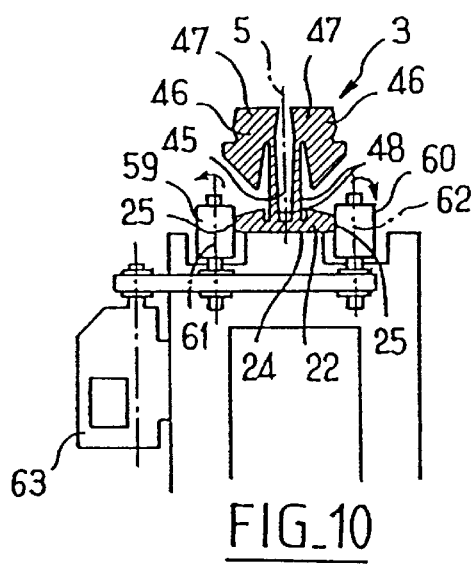
FIG_10
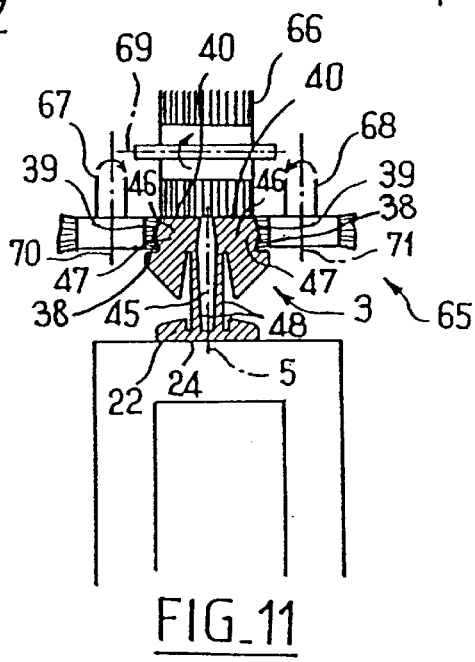
FIG_11
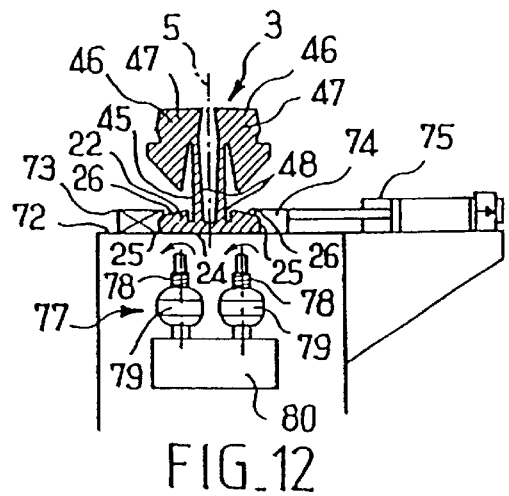
FIG_12
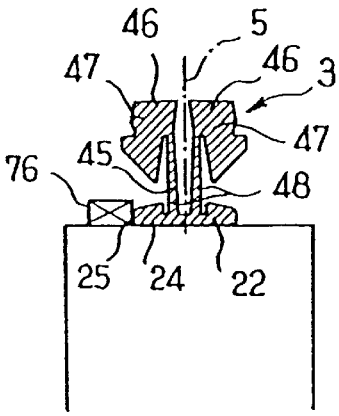
FIG_13

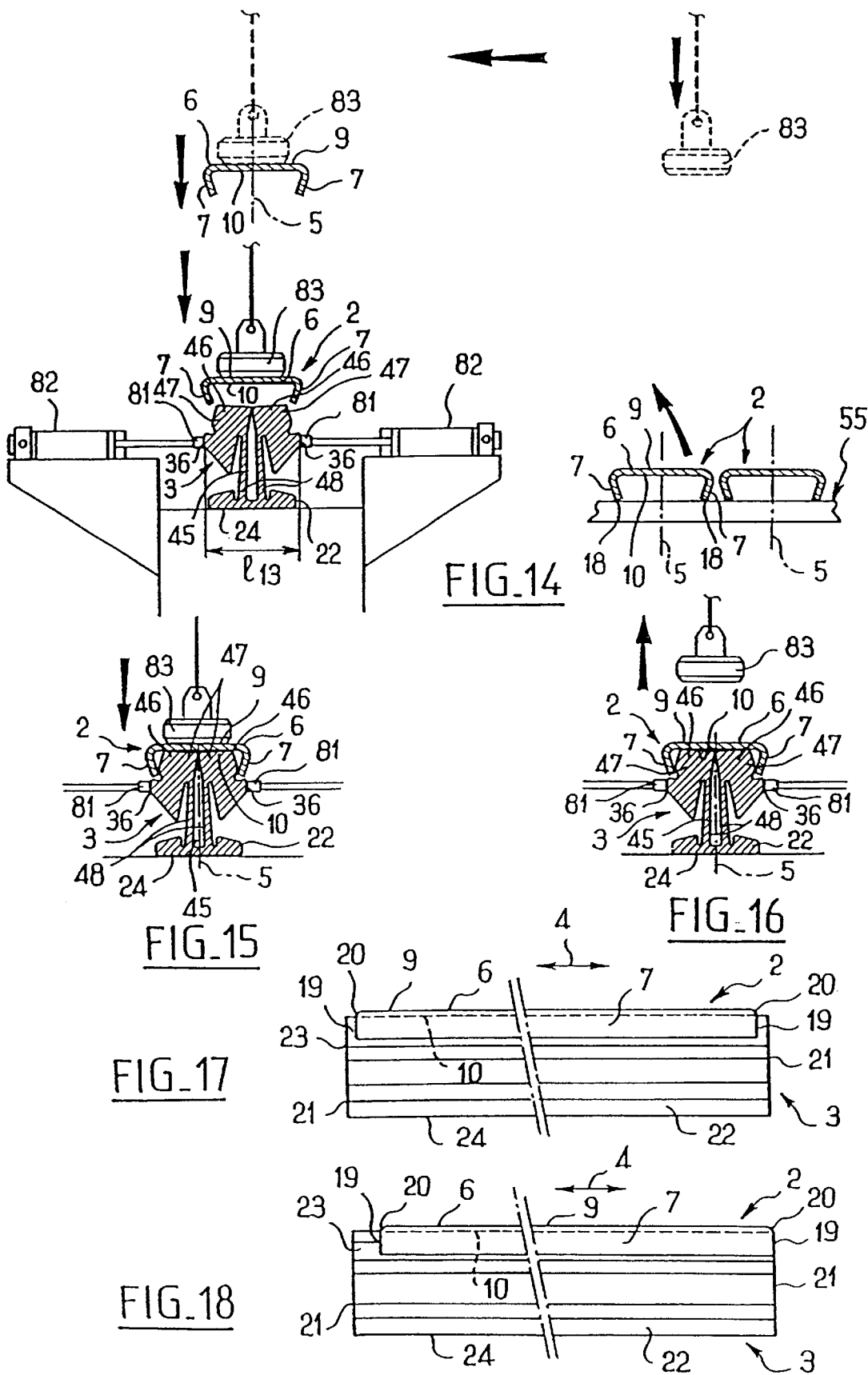

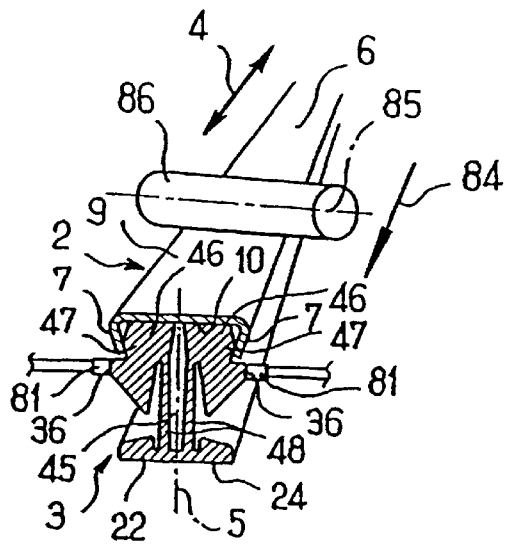
FIG_19
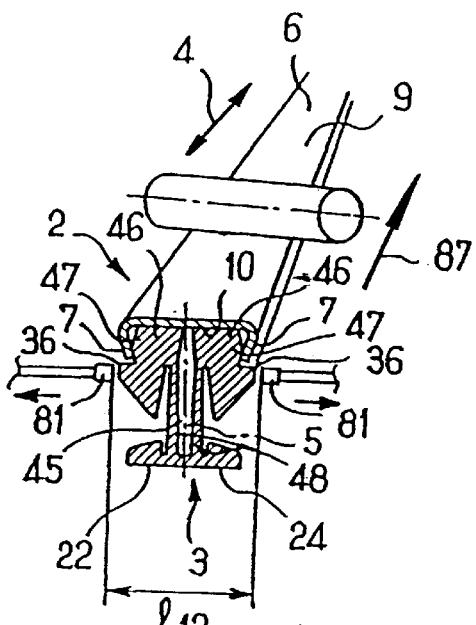
FIG_20
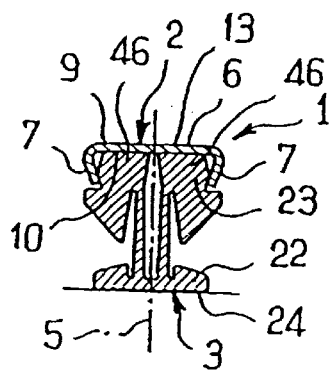
FIG_21
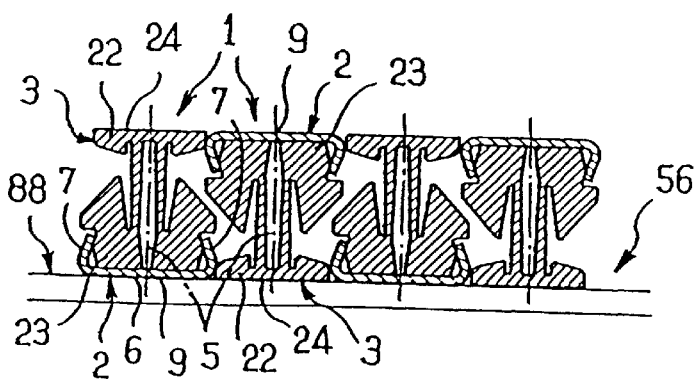
FIG_22

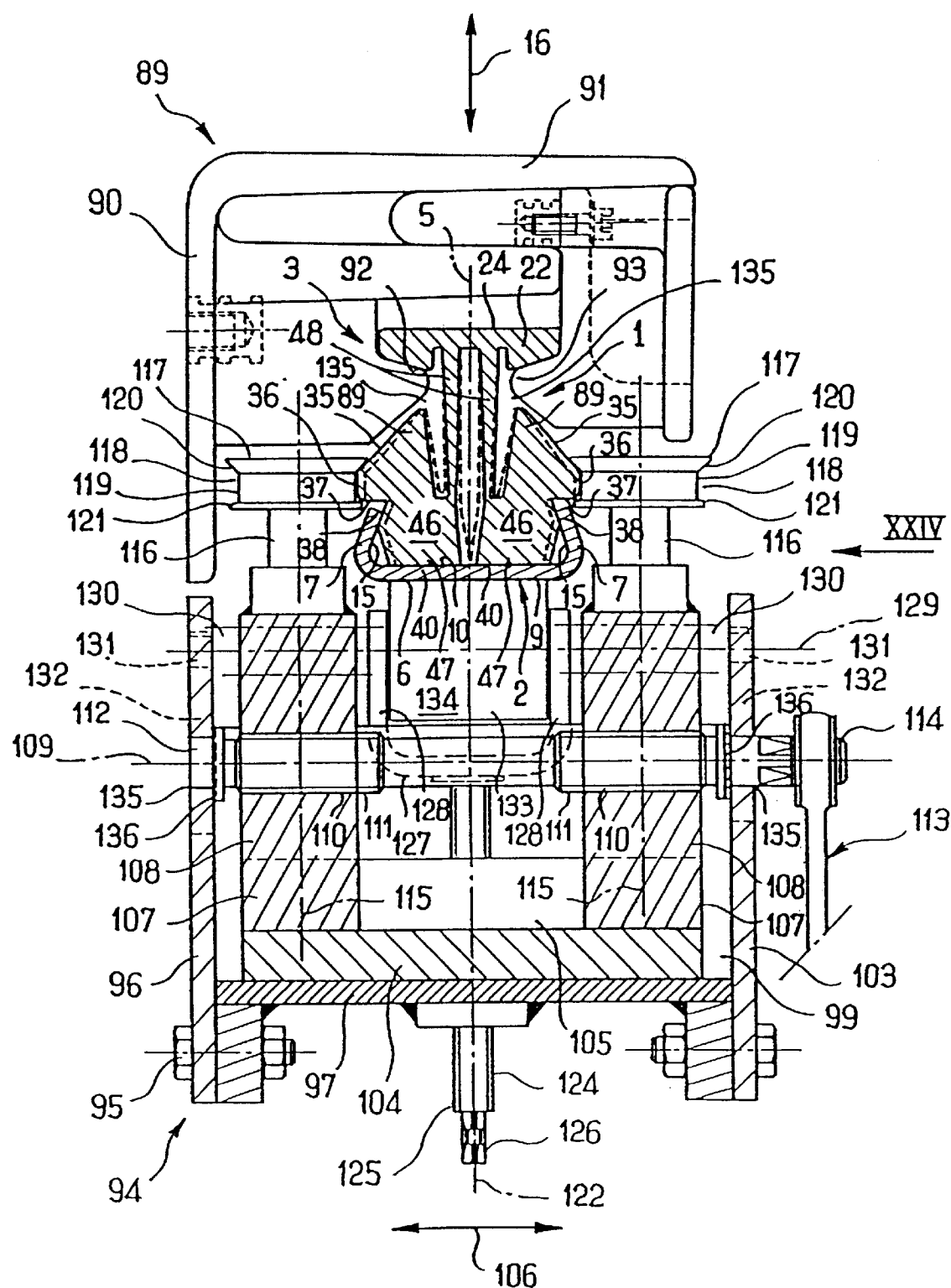
FIG_23

METHOD OF FABRICATING AND A METHOD OF RENOVATING AN ELECTRICAL POWER SUPPLY RAIL, A CARRIAGE FOR CARRYING OUT THE METHODS, A RAIL MOUNTING BODY AND A RAIL WEAR PLATE FOR USE IN THE FABRICATION METHOD, AND AN ELECTRICAL POWER SUPPLY RAIL OBTAINED BY THE METHOD

BACKGROUND OF THE INVENTION

1. Field of the Invention

The present invention relates to a method of fabricating a longitudinal rail for supplying a mobile with electrical power.

2. Description of the Prior Art

Said rail includes two electrically conductive longitudinal components which are fastened together and have respective substantially constant cross sections and a common median longitudinal plane of symmetry, namely a mounting body adapted to be mounted on a support and a wear plate which is worn by said mobile, said mounting body including, in mutually opposed positions in a transverse direction in said plane, a rigid longitudinal base for mounting it on said support and a longitudinal head for receiving said wear plate, which head is delimited in the direction away from said base in said transverse direction by an electrically conductive face straddling said plane and having a rebate in the direction away from said plane on respective opposite sides of said electrically conductive face, said plate including a flat central strip for transmitting electrical power to said mobile, straddling said plane, having opposite said base in said transverse direction a contact face for said mobile and facing toward said base in said transverse direction an electrically conductive face bearing flat on said electrically conductive face of said body and two lateral rims on respective opposite sides of said plane and forming a projection toward said base in said transverse direction relative to said central strip, each of said rims having, facing toward said plane, an attachment face for attaching it to said body, which attachment face converges with said plane in the direction away from said central strip in said transverse direction to define a hook shape interengaged with a respective rebate so that said wear plate is fastened to said head of said mounting body by a mutual nesting effect.

Non-limiting examples of mobiles that can be supplied with electrical power include certain rail vehicles, such as metros, and some lifting or materials handling plant, such as travelling overhead cranes, moving along a particular trajectory along which are placed one or more lengths of a rail of the type indicated in the preamble, on the wear plate of which presses an electrical pick-up member such as a shoe carried by the mobile.

In this regard, a rail of the type to which the present invention relates can equally well be rectilinear or curved, and in the latter case, as will be obvious to a person skilled in the art, a median fiber of the rail is taken as the longitudinal reference and a surface defined by respective axes of symmetry of different sections of the rail perpendicular to its median fiber are taken as the median plane of symmetry.

Various designs of electrical power supply rails consisting of the association of a mounting body and a wear plate fastened together are well known in the art and widely used.

The mounting body is generally used to mount the rail on supports such as insulators and can itself be used to mount electrically insulative caps to protect against accidental contact with the power supply rail. Its cross section is generally much greater than that of the other component, and is determined on the one hand by the stiffness to be imparted to the rail and on the other hand by the current that is to flow in it. To reduce its weight, for a given cross section, the mounting body is generally made of aluminum or aluminum alloy.

The wear plate, which is adapted to cooperate with the electrical pick-up member carried by the mobile, is therefore made from stainless steel, for example, which is more resistant to wear than aluminum or aluminum alloy, although more dense, or of copper or brass. Its cross section is limited to that necessary to insure a particular minimum time of operation, at the end of which it is completely worn down, and its shape can vary according to the manner in which it is fastened to the mounting body.

One fastening method relying on clipping of the rims of the wear plate into rebates on the head of the mounting body, as indicated in the preamble, is used by the company BRECKNELL WILLIS, which employs an aluminum mounting body which is rigid, especially in the area of its head, and two stainless steel members, each of which corresponds to one half of the wear plate, i.e. to one of the parts thereof defined by the median plane of longitudinal symmetry. The electrically conductive faces of the mounting body, the central strip of the wear plate, and the contact face for the mobile are plane and perpendicular to the median longitudinal plane of symmetry. To assemble the wear plate to the mounting body, the two parts of the wear plate, which are initially independent of each other, are heated to a temperature higher than that of the mounting body and applied to the head thereof so that the corresponding respective half of the central strip is applied to a respective half of the electrically conductive face of the head and their rims are pressed against the corresponding respective rebates; when the two parts are perfectly face-to-face in this way, in the median longitudinal plane of symmetry, they are welded together and the assembly is then allowed to cool, whereby, because of the different coefficients of thermal expansion of stainless steel and aluminum, the wear plate grips the head of the mounting body and is fastened to it by this gripping effect alone.

However, the pressure applied by the stainless steel wear plate to the aluminum mounting body is afterwards closely dependent on temperature, and in the event of extremely low temperatures the pressure can be insufficient to retain the wear plate against movement in longitudinal translation on the mounting body and to insure an adequate quality of electrical conduction between the two components of the rail.

French patent FR-A-2 227 148 discloses a variant of the method indicated in the preamble including a succession of steps, the first of which consists of separately prefabricating:

said mounting body, conforming it so that said head is divided in said plane into two halves joined together by said base and delimiting between them a longitudinal slot open in the direction away from said base in said transverse direction, each of said two halves having opposite said base in said transverse direction a free end including a respective half of said electrically conductive face of said body and a respective rebate and being adapted to flex elastically relative to said base, in particular toward each other from a rest configuration in which said mounting body is prefabricated and as far as a maximum elastic flexing configuration, said two halves of said electrically conductive face of said body having an orientation relative to said plane such that they diverge from said base in said transverse direction toward said plane in said rest configuration, and said wear plate, conforming it so that its rims define between them, perpendicularly to said plane, in an area of closest approach thereto in the direction away from the central strip in said transverse direction, a width less than the maximum width of said head perpendicularly to said plane between said halves of said electrically conductive face of said body and said rebates, in said rest configuration, The wear plate and the mounting body are therefore made in one piece, and the next step consists of forcibly nesting the wear plate over the head of the mounting body, by virtue of elastic flexing of the wear plate such that its rims move apart and elastic flexing of the two halves of the head such that they move toward each other until they abut against each other, which defines a maximum elastic flexing configuration that the two halves of the head retain at the end of fabrication of the rail and in which the slot is closed.

A final step consists of permanently fastening the wear plate to the mounting body by spiking, riveting or welding the rims of the wear plate to the head of the mounting body.

The above document teaches respectively concave and convex V-shaped cross sections for the electrically conductive faces of the wear plate and the mounting body, so that any tendency for the mounting body to resume its rest configuration by virtue of its elasticity is reflected in a tendency of the wear plate to press its electrically conductive face firmly flat against the electrically conductive face of the mounting body.

However, obtaining the above effect inevitably gives rise to major problems in that the wear plate is nested over the head of the mounting body with elastic prestressing such that it overcomes the elastic tendency of the two halves of the head to move apart from the relative position that they occupy at the end of fabrication of the rail, i.e. a relative position in which they abut one against the other and in which the slot that they define is closed, and the fact that the rims of the wear plate are firmly spiked, riveted or welded to the head of the mounting body after nesting, would seem more likely to oppose it.

Accordingly, given the coefficients of thermal expansion of the materials of the wear plate and the mounting body, namely stainless steel and aluminum or aluminum alloy, respectively, the electrically conductive face of the wear plate tends rather to move away from that of the mounting body if the temperature falls below the fabrication temperature, in which case the mutual contact pressure can be significantly reduced.

The spikes, rivets or welds joining the wear plate to the mounting body then undoubtedly oppose relative longitudinal sliding, but the quality of the electrical conduction between the wear plate and the mounting body is not insured.

What is more, the necessity for the wear plate to flex elastically in order for it to nest over the head of the mounting body and then to hold it elastically prestressed thereon imposes the choice for the wear plate of a semi-hard spring stainless steel, which is particularly fragile and costly, and necessarily limits the choice of geometrical characteristics that can be imparted to the wear plate; in particular, it must be relatively thin, which limits its service life.

What is more, the convex cross section that the face of the wear plate in contact with the electrical pick-up member carried by the mobile necessarily has in this case means that the pick-up member must have a concave shape, with a cross section complementary to the convex cross section, which complicates the manufacture of the pick-up member and rules out any transverse offset between it and the rail, i.e. mounting the pick-up member on the mobile, whose effective trajectory is rarely rigorously parallel to the rail, is made more complicated.

The object of the present invention is to remedy the above drawbacks of the prior art and, to this end, the present invention proposes a method of fabricating a longitudinal rail for supplying a mobile with electrical power, said rail including two electrically conductive longitudinal components which are fastened together and have respective substantially constant cross sections and a common median longitudinal plane of symmetry, namely a mounting body adapted to be mounted on a support and a wear plate which is worn by said mobile, said mounting body including, in mutually opposed positions in a transverse direction in said plane, a rigid longitudinal base for mounting it on said support and a longitudinal head for receiving said wear plate, which head is delimited in the direction away from said base in said transverse direction by an electrically conductive face straddling said plane and having a rebate in the direction away from said plane on respective opposite sides of said electrically conductive face, said plate including a flat central strip for transmitting electrical power to said mobile, straddling said plane, having opposite said base in said transverse direction a contact face for said mobile and facing toward said base in said transverse direction an electrically conductive face bearing flat on said electrically conductive face of said body and two lateral rims on respective opposite sides of said plane and forming a projection toward said base in said transverse direction relative to said central strip, each of said rims having, facing toward said plane, an attachment face for attaching it to said body, which attachment face converges with said plane in the direction away from said central strip in said transverse direction to define a hook shape interengaged with a respective rebate so that said wear plate is fastened to said head of said mounting body by a mutual nesting effect, said method including a succession of steps, the first of which consists of:

a) prefabricating separately:

said mounting body, conforming it so that said head is divided in said plane into two halves joined together by said base and delimiting between them a longitudinal slot open in the direction away from said base in said transverse direction, each of said two halves having opposite said base in said transverse direction a free end including a respective half of said electrically conductive face of said body and a respective rebate and being adapted to flex elastically relative to said base, in particular toward each other from a rest configuration in which said mounting body is prefabricated and as far as a maximum elastic flexing configuration, said two halves of said electrically conductive face of said body having an orientation relative to said plane such that they diverge from said base in said transverse direction toward said plane in said rest configuration, and said wear plate, conforming it so that its rims define between them, perpendicularly to said plane, in an area of closest approach thereto in the direction away from the central strip in said transverse direction, a width less than the maximum width of said head perpendicularly to said plane between said halves of said electrically conductive face of said body and said rebates, in said rest configuration, in which method, in step a), there are also prefabricated:

said mounting body, conforming it so that said two halves of said electrically conductive face of said body have an orientation relative to said plane such that they converge toward said base in the direction toward said plane in said maximum elastic flexing configuration and in a particular intermediate elastic flexing configuration, in which said slot is still open in the direction away from the base in said transverse direction, they are mutually coplanar and perpendicular to said plane and then constitute said electrically conductive face of said body, which is plane and perpendicular to said plane, and said wear plate, permanently conforming it so that said contact face for the mobile and said electrically conductive face of said central strip are plane and perpendicular to said plane and its rims define between them, perpendicularly to said plane, in an area of closest approach thereto in the direction away from said central strip in said transverse direction, a width less than the maximum width of said head, perpendicularly to said plane, between said halves of said electrically conductive face of said body and said rebates, not only in said rest configuration but also in said particular intermediate configuration, but at least equal to, and in particular greater than, the maximum width of said head perpendicular to said plane between said halves of said electrically conductive face of said body and said rebates, in said maximum elastic flexing configuration, and at least equal to, and in particular greater than, the minimum width of said head, perpendicularly to said plane, at the level of said rebates in said particular intermediate configuration, and so that said attachment faces define with said electrically conductive face of said wear plate a shape complementary to the shape that said rebates define with said electrically conductive face of said body in said particular intermediate configuration, and which method includes, after step a), the following succession of steps:

b) applying to said two halves of said head opposite thrusts to move them toward each other, perpendicular to said plane, from said rest configuration to said maximum elastic flexing configuration, c) maintaining said thrusts to retain said two halves of said head in said maximum elastic flexing configuration, nesting said wear plate over said head to place said electrically conductive face of said wear plate in bearing engagement with said halves of said electrically conductive face of said body and to place said rims on respective opposite sides of said head, facing said rebates, and d) releasing said thrusts while holding said electrically conductive face of said wear plate in bearing engagement with said halves of said electrically conductive face of said body so that said two halves of said head flex elastically toward each other, perpendicularly to said plane, and said rebates abut in this direction against said attachment faces of said rims of said wear plate, which hold said two halves of said head prestressed in elastic flexing in said particular configuration in which said two halves of said electrically conductive face of said body are also mutually coplanar and said electrically conductive face of said wear plate is therefore pressed flat against it.

It will be obvious to the person skilled in the art that, in this case, the pressure applied by the two halves of the head of the mounting body, which is advantageously prefabricated in one piece during step a) from a material chosen from the group comprising aluminum and aluminum alloys, on the wear plate, which is also advantageously made in one piece during step a) from a material chosen from the group comprising stainless steel, copper and copper alloys, depends almost exclusively on the elastic properties of the material of the mounting body and the flexing applied to the halves of the head in said intermediate flexing configuration, in comparison with the rest configuration. That pressure is therefore practically constant and independent of temperature, or can in any event be high enough for any variations that may result from differential thermal expansion to remain sufficiently low, in comparison, for it to be sure that the pressure remains sufficiently high in all circumstances to prevent movement in translation of the wear plate relative to the mounting body and to preserve good electrical conduction between the mounting body and the wear plate.

What is more, compared to the prior art technique previously mentioned, it is faster, less costly and more reliable to produce a rail by the method according to the invention.

In particular, compared to the BRECKNELL WILLIS technique, it is not necessary to weld several initially separate parts of the wear plate, which means that the equipment necessary for such welding can be dispensed with, as can the reworking steps necessary to obtaining an appropriate flatness and surface state of the face of the wear plate in contact with the mobile. What is more, although machining the weld, in practice milling it, generally causes a median longitudinal depression in the contact face, accelerating wear of the electrical pick-up member carried by the mobile, when the BRECKNELL WILLIS technique is used, the possibility of making the wear plate in one piece when the method according to the invention is used means that its face in contact with the mobile can be flat without discontinuities in the transverse direction, reducing wear of the electrical pick-up member carried by the mobile.

Compared to the technique described in FR-A-2 227 148, it is not necessary to rely on the elasticity of the wear plate, and to the contrary its cross section can be considered to be non-deformable in comparison with the mounting body, which gives a greater choice as to the steel used, which can be less fragile and less costly than spring steel, and a greater choice as to the thickness of the plate, which can therefore be sufficiently thick to have a satisfactory service life.

What is more, the wear plate is retained on the head entirely by the elasticity of the mounting body and the respective conformations of its head and the wear plate, which makes it possible to dispense with any other form of fastening them together by spiking, riveting or welding, together with the reworking operations and equipment needed for this.

What is more, compared to the technique described in FR-A-2 227 148, the method of the invention provides the benefit of a flat face of the wear plate in contact with the mobile, which simplifies the manufacture and the mounting of the electrical pick-up member carried by the mobile, even if longitudinal movement of the mobile is accompanied by some transverse movement relative to the rail.

As is known in the art, the electrical conduction between the head of the mounting body and the wear plate can naturally be improved and all risk of penetration of an electrolyte between them avoided by applying a contact grease to at least one of said electrically conductive faces, and preferably to the rebates and/or the attachment faces, prior to step c). Such application is preferably immediately preceded or accompanied by brushing them clean; in particular, when the mounting body is made of aluminum or aluminum alloy, brushing the electrically conductive face of the body, and preferably also of the rebates, eliminates from them the alumina that would compromise electrical conduction with the wear plate, which alumina is prevented from forming again by applying a neutral contact grease immediately afterwards.

The fabrication method in accordance with the invention can be carried out simultaneously throughout the longitudinal dimension of the mounting body and the wear plate or successively in longitudinally localized areas of the mounting body and the wear plate in longitudinal succession in a given longitudinal direction. What is more, it can be carried out entirely in the shop or partly in the shop and partly on a site on which the rail is used.

Accordingly, in accordance with one embodiment of the method of the invention, the mounting body is fixed to the support in a particular position of use, on a site where the rail is used, between steps a) and b), and steps b), c) and d) are carried out on site with the mounting body fixed to the support in said particular position.

When a string of rails is made by this embodiment of the method according to the invention, each joint between the wear plates corresponding to two longitudinally adjoining rails can be made to coincide with the joint between the corresponding mounting bodies, but it is preferable to use the wear plates to insure mechanical continuity between the rails and the mounting bodies to ensure alignment of the wear plates. To this end, one particular embodiment of the method according to the invention is characterized in that several lengths of said mounting body are fixed to said support in said particular position on said site, between steps a) and b), by placing said lengths in alignment with each other in a longitudinal direction, and wherein steps b), c) and d) are carried out with said lengths fixed to said support in said particular position on said site using several lengths of said wear plate, aligned with each other in a longitudinal direction with the joints between them offset longitudinally relative to the joints between said lengths of said mounting body.

Given that the method of the invention implies prefabricating a mounting body and a wear plate with respective specific conformations, the present invention also includes a mounting body and a wear plate as respectively obtained by implementing step a).

In this regard, in an electrically conductive longitudinal body in accordance with the invention, having a substantially constant cross section and a median longitudinal plane of symmetry and including in mutually opposite positions in a transverse direction in said plane, a rigid longitudinal base for mounting it on said support and a longitudinal head for receiving a wear plate, which head has a rebate in the direction away from said plane, on respective opposite sites thereof, and is divided in said plane into two halves joined together by said base and delimiting between them a longitudinal slot open in the direction away from said base in said transverse direction, each of said two halves having opposite said base in said transverse direction a free edge including a plane edge face and a respective rebate and being adapted to flex elastically relative to said base, in particular in the direction toward each other, from a rest configuration in which said mounting body is prefabricated and as far as a maximum elastic flexing configuration, as proposed in FR-A-2 227 148, said two edge faces have an orientation relative to said plane such that they diverge from said base in the direction toward said plane in said rest configuration, and, in a particular intermediate elastic flexing configuration, in which said slot is still open in the direction away from said base in said transverse direction, they are mutually coplanar and perpendicular to said plane and together form a plane face delimiting said head in the direction away from said base in said transverse direction between said rebates.

The body can be made by assembling separate components but is preferably made in one piece from a material chosen from the group comprising aluminum and aluminum alloys.

Apart from the advantages of saving weight, good electrical conduction and good thermal conduction that they already offer in prior art rails of the type indicated in the preamble, compared to all-steel rails, aluminum and aluminum alloys offer advantages specific to the use of the present invention by offering increased possibilities in terms of the choice of the shape and the dimensions of the cross section of the mounting body, for the best possible combination of the elastic flexibility required by the present invention with a satisfactory contact pressure between the two halves of the head of the mounting body and the wear plate, in terms of mutual mechanical connection and electrical conduction between them, and the choice of the composition of the alloy, with the same aim, for a given shape and given dimensions of the cross section of the mounting body, i.e. retaining the same die for extruding the mounting body.

The body can also have various optional features intended to facilitate steps b), c) and d) of the method or to improve the result thereof.

Accordingly, in one preferred embodiment, each half of said head includes, in the direction away from said base in said transverse direction, a rigid edge part comprising in particular the respective edge face and the respective rebate, and, between said rigid edge part and said base, an intermediate part for connecting said edge part to said base, said intermediate part defining in comparison with said base and said edge part a weakened area encouraging elastic flexing of the respective half of said head between said rest configuration and said maximum elastic flexing configuration.

It is therefore certain that, in said predetermined intermediate configuration, the head has a perfectly defined external geometry, closely complementary to the inside geometry of the wear plate, which obtains the strongest possible and most uniform possible mutual application, combined with the facility to choose the elasticity of each half of the head in flexing, which conditions the pressure that each half of the head applies to the respective associated rim of the wear plate in said particular intermediate elastically flexed configuration, i.e. after fabrication of the rail, in particular by the method of the invention.

To this end, also, each rebate is preferably farther from said base in said transverse direction than the connection between the respective rigid edge part and the respective elastically flexible intermediate part.

To increase in particular the cross section of the mounting body, despite the provision of weakened areas of preferred elastic flexing, which are necessarily thin, i.e. in order to respond to the requirements for carrying current, each rigid edge part has an extension toward said base in said direction, alongside the respective elastically flexible intermediate part in the direction away from said plane and forming with it a respective longitudinal slot open toward said base in said transverse direction, in particular so as not to impede flexing of the halves of the head.

The extension of each rigid edge part is preferably conformed to enable an insulative cap of traditional shape to be attached to said base.

What is more if, as is preferred to facilitate steps b) and c) of the method, each half of said head has, in the direction away from said plane, closer to said base than the respective rebate, a respective flat approximately parallel to said plane for applying a respective thrust toward the latter to move said half from said rest configuration to said maximum elastic flexing configuration, said flat is advantageously on the respective extension and closer to said base in said direction than the connection between the respective rigid edge part and the respective elastically flexible intermediate part.

The aforementioned flat advantageously projects in the direction away from said plane relative to the respective adjoining areas of said body, which prevents the risk of the means employed to apply said thrust interfering with those areas.

It is naturally important for the thrust applied to the two halves of the head in the direction toward each other in steps b) and c) does not cause plastic deformation of the halves of the head and to this end each half of said head preferably has, in the area of said slot farthest from said base in said transverse direction, an area of abutment against the other half of said head in said maximum elastic flexing configuration.

To offer a distributed support to the attachment faces of the rims of the wear plate and to reflect the elastic flexing of the halves of the head back toward the rest configuration, in practice only as far as the particular intermediate configuration, during step d) of the method, by firm application of the electrically conductive face of the central strip of the wear plate to the electrically conductive face of the head, each rebate is advantageously formed by a flat facing in the direction away from said plane and progressively converging with it in the direction toward the base in said transverse direction, at least in said particular intermediate configuration. The two rebates thereby apply to the rims of the wear plate a sort of cam effect, the consequence of which is that, as the head is widened by the elastic flexing of its two halves in the direction away from each other perpendicular to the median plane, and symmetrically relative to that plane because of their symmetry, the rebates apply to the rims of the wear plate traction toward the base in said transverse direction so that the two electrically conductive faces are pressed together as uniformly and as flat as possible to minimize the risk of "pinholing" of those faces by the effects of arcs struck between them.

This cam effect is preserved by virtue of the elastic prestressing of the head of the mounting body and the opening of the slot thereof at the end of fabrication of the rail, regardless of dimensional variations of the wear plate and the mounting body as a result of thermal expansion when the rail is in service, with the result that the two electrically conductive faces remain firmly pressed together at all times, as uniformly and as flat as possible, and with optimum conditions of electrical conduction between them.

In step a), the rebates and the rims of the wear plate are preferably dimensioned in said transverse direction so that the part of each rebate farthest from the electrically conductive face of the body in said transverse direction remains disengaged from the respective corresponding rim at the end of step d), so that no obstacle impedes this effect.

What is more, to facilitate fitting the wear plate to the head of the mounting body in step c), each half of the head preferably has, between the respective outside face and the respective rebate, an end facet facing away from said plane, joining the respective end face and the respective rebate and progressively converging with said plane in the direction away from the base in said transverse direction, in particular in the maximum flexing configuration. In this configuration, these facets constitute a bevel on respective opposite sides of the combination of the end faces of the halves of the head, to guide the rims of the wear plate as the latter is engaged on the head, in the direction toward the base of the body in said transverse direction.

To constitute the wear plate of the rail, in particular when it is made by the method according to the invention, the invention proposes an electrically conductive longitudinal plate having a substantially constant cross section and a median longitudinal plane of symmetry and including a flat central strip straddling said plane, having two mutually opposite faces, and two lateral rims on respective opposite sides of said plane and projecting from the same one of said faces, having a face directed toward said plane that converges therewith in the direction away from said central strip in a transverse direction of said plane to define a hook shape, in which wear plate said faces of its central strip are plane and perpendicular to said plane.

Said plate can obviously be assembled from several components but it is preferably made in one piece from a material chosen from the group comprising stainless steel, copper and copper alloys.

To cooperate with the rebates of the head when they are plane, said faces of the rims, constituting the attachment faces, are preferably plane, enabling them to be applied flat to the rebates in the head in said particular intermediate elastically flexed configuration, i.e. when the wear plate has been assembled to the mounting body, which encourages electrical conduction at this level.

To this end, in a preferred embodiment of step a) of the method according to the invention, the mounting body and the wear plate are prefabricated so that the rebates and the attachment faces are plane and at the same angle to the corresponding half of the electrically conducting face of the body and the electrically conducting face of the central strip, so that at the end of step d) the rebates and the attachment faces are pressed flat together.

In a particularly simple configuration, each rim advantageously has a rectilinear longitudinal free edge delimiting said respective face or attachment face in the direction away from the central strip in said transverse direction and each rim is preferably flat and connected to the central strip by a respective longitudinal bend.

Given that the method according to the invention imparts to the rail obtained, of the type indicated in the preamble, a structure which is novel in itself, the present invention also provides a longitudinal electrical power supply rail of that type, which can be made by the method according to the invention, or by some other method, if necessary, said rail including two electrically conductive longitudinal components fastened together having respective substantially constant cross sections and a common median longitudinal plane of symmetry, namely a mounting body for mounting said rail on a support and a wear plate which is worn by said mobile, said mounting body including, in mutually opposed positions in a transverse direction in said plane, a rigid longitudinal base for mounting it on said support and a longitudinal head for receiving said wear plate, which head is delimited in the direction away from said base in said transverse direction by an electrically conductive face straddling said plane and having a rebate in the direction away from said plane on respective opposite sides of said electrically conductive face, said head is divided in said plane into two halves joined together by said base and delimiting between them a longitudinal slot open in the direction away from said base in said transverse direction, each of said two halves having opposite said base in said transverse direction a free end including a respective half of said electrically conductive face of said body and a respective rebate, and said wear plate including a flat central strip for transmitting electrical power to said mobile, straddling said plane, having opposite said base in said transverse direction a contact face for said mobile and facing toward said base in said transverse direction an electrically conductive face bearing flat on said electrically conductive face of said body and two lateral rims on respective opposite sides of said plane and forming a projection toward said base in said transverse direction relative to said central strip, each of said rims having, facing toward said plane, an attachment face for attaching it to said body, which attachment face converges with said plane in the direction away from said central strip in said transverse direction to define a hook shape interengaged with a respective rebate so that said wear plate is fastened to said head of said mounting body by a mutual nesting effect, and said halves of said head are held in a particular configuration prestressed in elastic flexing by said rebates bearing against said attachment faces of said wear plate in the direction away from said plane, as proposed in FR-A-2 227 148, in which rail said electrically conductive face of said mounting body and said electrically conductive face of said wear plate are plane and perpendicular to said plane and said longitudinal slot is open in the direction away from said base in said transverse direction in said particular elastic flexing prestressing configuration in which said halves of said head are retained by bearing engagement of said rebates against said attachment faces of said wear plate in the direction away from said plane.

When the rail is fabricated by the method according to the invention, the particular elastically flexed prestressed configuration is naturally the aforementioned particular intermediate elastically flexed configuration.

The rail can also have all of the features resulting either from the different variants of the method according to the invention or the configuration of the mounting body and the wear plate in accordance with the invention, according to the above embodiments thereof.

In particular, a contact grease is advantageously disposed at least between said electrically conductive faces and preferably between said rebates and said attachment faces, and said rebates and said attachment faces are advantageously plane, converge toward said plane in the direction toward said base in said transverse direction, and are pressed flat together.

As a consequence of fabrication by the method according to the invention, on the one hand, and in a manner that is particularly advantageous in allowing a worn or damaged wear plate to be replaced without it being necessary also to change the body, on the other hand, each half of said head is advantageously adapted to flex elastically relative to said base in the direction toward said plane as far as a maximum elastic flexing configuration in which the maximum dimension of said head perpendicular to said plane between said halves of said electrically conductive face of said body and said rebates is at most equal to the width defined between said rims perpendicularly to said plane in an area of maximum closeness thereto in the direction away from said central strip in said transverse direction.

Accordingly, by returning the head to its maximum elastically flexed configuration, the wear plate can be demounted from it, a new one fitted and the head allowed to return to its rest configuration, in practice until its two halves abut against the rims of the new wear plate, again in the particular intermediate configuration.

This operation can be carried out in the shop, after demounting the rail from its support on its site of use and before remounting the rail on its support, but is preferably carried out on site.

To this end, the present invention proposes a method of renovating a rail when its wear plate is worn out or damaged, in which method said mounting body of said rail, said halves of said head of which can flex elastically relative to its base, is fixed to a support in a particular position of use on a site on which said rail is used, said method being carried out on said site with said mounting body fixed to said support in said particular position and including the following succession of steps:

e) applying to said two halves of said head opposite thrusts to move them toward each other, perpendicular to said plane, from said rest configuration to said maximum elastic flexing configuration, f) maintaining said thrust to retain said two halves of said head in said maximum elastic flexing configuration, separating said wear plate from said head to separate it from said mounting body, g) maintaining said thrust to retain said two halves of said head in said maximum elastic flexing configuration, nesting said wear plate over said head to place said electrically conductive face of said wear plate in bearing engagement with said halves of said electrically conductive face of said body and to place said rims on respective opposite sides of said head, facing said rebates, and h) releasing said thrusts while holding said electrically conductive face of said wear plate in bearing engagement with said halves of said electrically conductive face of said body so that said two halves of said head flex elastically toward each other, perpendicularly to said plane, and said rebates abut in this direction against said attachment faces of said rims of said wear plate, which hold said two halves of said head prestressed in elastic flexing in said particular configuration in which said two halves of said electrically conductive face of said body are also mutually coplanar and said electrically conductive face of said wear plate is therefore pressed flat against it.

In a variant, the following succession of steps can be effected between steps f) and g):

i) releasing said thrusts so that said two halves of said head flex elastically in the direction away from each other perpendicularly to said plane and assume a rest configuration, and j) applying said thrusts again to said two halves of said head to move them from said rest configuration to said maximum elastic flexing configuration.

To avoid at least partly irreversible plastic deformation of the mounting body on applying the thrust intended to return it to its maximum elastically flexed configuration, each half of the head naturally preferably comprises, in the area of said slot farthest from the base in said transverse direction, an area which abuts against the other half of the head in the maximum elastically flexed configuration.

What is more, to facilitate the application of said thrust, each half of the head preferably has, in the direction away from said plane, nearer the base than the corresponding rim of the wear plate, a respective flat, approximately parallel to said plane, for applying a respective thrust toward the latter in order to move said half into the maximum elastically flexed configuration, each flat advantageously projecting in the direction away from said plane relative to the respective adjoining areas of the rail so that the means used to apply said thrust do not interfere either with the wear plate to be changed or with the new wear plate.

The renewal method according to the invention can be carried out in the shop, after demounting the rail from its support on the site of use and returning it to the shop, which then necessitates returning the rail to its site of use to mount it again on its support, or more usually replacing it immediately with a new or renovated rail, and storing it after renovation for installation on a new site. It is consequently preferable to carry it out on the site on which the rail is used, with the mounting body fixed to its support in its particular position of use, and with the mounting body fixed to the support.

What is more, the renewal method according to the invention can be carried out simultaneously throughout the longitudinal dimension of the rail but, for reasons of the overall size of the equipment used for this purpose when the method is carried out on site, in particular, it is preferable to carry it out successively in longitudinally localized areas of the rail in longitudinal succession in a given longitudinal direction.

The method is therefore advantageously carried out on site on several lengths of rail longitudinally aligned with each other, with the joints between the new lengths of wear plate offset longitudinally relative to the joints between the lengths of mounting body, which enables use of the wear plates to insure mechanical continuity between the successive rails and to align the wear plates optimally, despite possible alignment defects between the mounting bodies, to limit the abrasion suffered by the pick-up member, such as a shoe, on passing from one wear plate to another.

To facilitate steps e), f), g), h) and where applicable steps i) and j) of the renewal method according to the invention, in particular on site, and likewise steps b), c), d) of the fabrication method according to the invention, in particular on site, the present invention proposes a carriage adapted to travel along the rail or the mounting body and carrying out those steps as it moves forward.

To this end, the carriage is characterized in that it includes:

a rigid chassis having a median longitudinal plane of symmetry, removable mechanical connecting means between said chassis and said mounting body in an orientation in which said median longitudinal plane of symmetry coincides with the median longitudinal plane of symmetry of said mounting body, said means supporting said chassis via said mounting body and guiding longitudinal movement of said chassis in translation relative to it, lateral thrust means on respective opposite sides of said longitudinal plane and symmetrical to each other with respect to said plane, at a level corresponding to an area of said head of said mounting body not covered by said wear plate when said rail is fabricated, means for controlled forcible movement of said lateral thrust members toward and away from said plane, perpendicularly to it, retaining their mutual symmetry, a central thrust member disposed in said plane, and means for controlled forcible movement of said central thrust member both ways in a transverse direction in said plane.

To facilitate the forward movement of the carriage, said mechanical connecting means are preferably rolling means.

Similarly, to this end, said lateral thrust members advantageously include at least one pair of rollers freely rotatable about a respective axis parallel to said transverse direction in said plane on a respective slider and said means for moving said lateral thrust members include slideways on said carriage for guiding said sliders in a direction perpendicular to said plane with no other possibility of relative movement and adjustable means for positioning said sliders along said slideways. In a particularly simple manner, said means for adjustably positioning said sliders include a screw mounted to rotate on said chassis about an axis perpendicular to said plane, immobilized against any other movement relative to said chassis, and meshing with respective opposite threads of said sliders.

Said lateral thrust members preferably include two sets of said pairs, symmetrical to each other with respect to a particular transverse plane of said carriage, constituting a plane of symmetry for said central thrust member, and said means for moving said lateral thrust members constitute two respective corresponding sets which are mutually independent.

In a particularly simple and effective manner said rolling means are said rollers. In particular, if the mounting body of the rail includes flats projecting relative to the adjoining areas in order to receive the thrust adapted to move it to the maximum elastically flexed configuration, each roller advantageously has an annular groove adapted to bear on a respective flat of said mounting body in areas on respective opposite sides thereof, which means that the carriage is supported by the mounting body in the required position and that the carriage is guided, in this position, along the mounting body or the rail.

Similarly, said central thrust member is preferably a roller freely rotatable about a transverse axis on a slider and said means for moving said central thrust member include a slideway on said carriage for guiding said slider in said transverse direction with no other possibility of relative movement and means for positioning said slider adjustably along said slideway. Said means for adjustably positioning said slider can include a screw mounted on said slider to rotate about a transverse axis of said plane, immobilized against any other movement relative to said slider, and meshing with a thread of said chassis.

Other features and advantages of the various aspects of the present invention will emerge from the following description, which relates to a non-limiting embodiment of the invention, and the accompanying drawings, which constitute an integral part of the description.

BRIEF DESCRIPTION OF THE DRAWINGS

FIGS. 5, 6 and 7 are respectively views in section taken along the line I—I in FIG. 2 and the line III—III in FIG. 4 with the transverse profile of the prefabricated wear plate as shown in FIG. 1 superposed on the transverse profile of the mounting body in its rest configuration as shown in FIG. 3, the comparative transverse profiles of the wear strip and the mounting body in its maximum elastically flexed configuration, in a transient relative position of fitting the wear plate to the mounting body, and the rail according to the invention incorporating the wear plate retained in place on the mounting body and in its particular intermediate configuration between its rest configuration and its maximum elastically flexed configuration.

FIG. 8 is a plan view of an installation for assembling the wear plate and the mounting body of a rail according to the invention.

FIGS. 9 to 14 are views in section respectively taken along the lines IX—IX, X—X, XI—XI, XII—XII, XIII—XIII, XIV—XIV in FIG. 8 of various workstations of the above installation at various stages in the fabrication of a rail according to the invention performed therein.

FIGS. 15 and 16 are views corresponding to those of FIG. 14 and showing two other successive steps of the fabrication of the rail according to the invention.

FIGS. 17 and 18 are lateral elevation views of the rail during fabrication, showing two examples of relative positioning of the wear plate and the mounting body in the longitudinal direction.

FIG. 19 and 20 show two further successive steps of the fabrication of the rail.

FIG. 21 shows a view of the finished rail, ready for storage and packaging.

FIG. 22 is a view of several rails in accordance with the invention in the packaging position and shown in cross section taken along the line XXII—XXII in FIG. 8.

FIGS. 23 and 24 show a carriage for assembling the wear plate to the mounting body already mounted on its support on the site of use of the rail or replacing the wear plate without demounting the body relative to the support on said site, the carriage being shown in the position of use and, like the rail, respectively in section taken along the line XXIII—XXIII in FIG. 24 and in lateral elevation perpendicularly to the common median longitudinal plane of symmetry of the rail and the carriage in a transverse direction indicated by an arrow XXIV in FIG. 23.

DETAILED DESCRIPTION OF THE PREFERRED EMBODIMENTS

Figure 2:
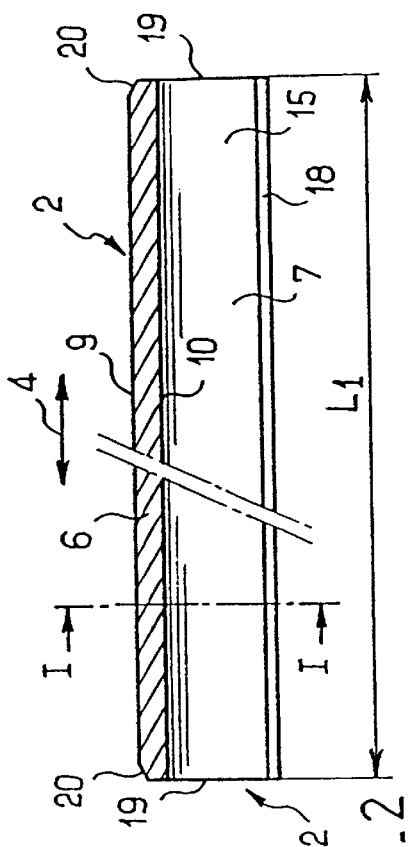
FIG. 2 shows the prefabricated wear plate in section taken along its median longitudinal plane of symmetry II—II in FIG. 1.

In a general manner, the reference numeral 1 designates a rail in accordance with the invention in the finished state, 2 designates its wear plate, considered as rigid during the fabrication of the rail as well as after it is finished, and 3 designates the mounting body which is elastically flexible, in a controlled manner, as will become apparent hereinafter. The reference numerals 4 and 5 respectively designate a longitudinal direction and a median longitudinal plane of symmetry of the rail 1, and therefore also of the wear plate 2 and the mounting body 3 when they are assembled together to constitute the rail 1; for convenience, the same reference numerals 4 and 5 respectively designate a longitudinal direction and a median longitudinal plane of symmetry of the wear plate 2 and the mounting body 3 even when they are separated from each other, and in particular in the state in which they are prefabricated before they are assembled together to constitute the rail 1. The aforementioned rigidity of the wear plate 2 and elastic flexibility of the mounting body are to be understood with reference to the comparative behaviors of their cross sections during and after the fabrication of the rail 1, given that both of them can flex elastically in their median longitudinal plane of symmetry 5.

For simplicity, the rail 1, the wear plate 2 and the mounting body 3 are described as rectilinear, but the skilled person will deem it obvious that the present invention also applies to curved rails and can easily make the necessary adaptations to the dispositions and procedures to be described without difficulty and without departing from the scope of the invention.

Figure 1:
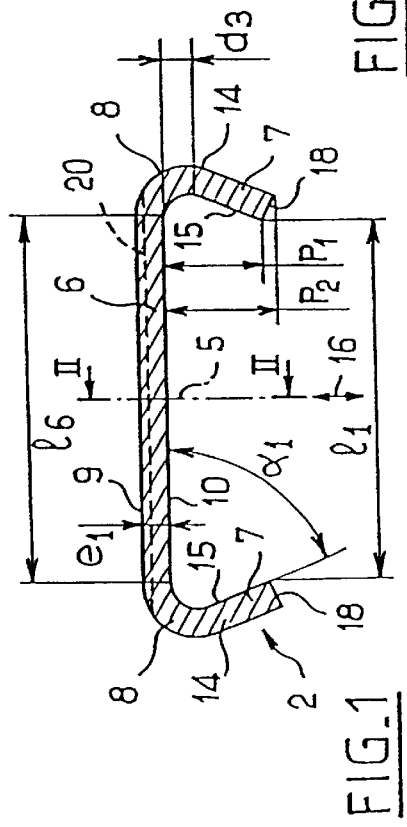
FIG. 1 shows a wear plate prefabricated in accordance with the present invention in cross section taken along the line I—I in FIG. 2.

Reference is made first to FIGS. 1 and 2, which show the wear plate as fabricated, and during its assembly to the mounting body 3 and when the rail 1 according to the invention is finished.

The wear plate 2 is advantageously made by shaping a strip which is preferably made of stainless steel, copper or brass, or by any appropriate method from any appropriate electrically conductive material, and has a constant cross section defined by a flat central strip 6 which straddles symmetrically the plane 5 to which it is perpendicular and two flat lateral longitudinal rims 7 on the same side of the plate 6 and on respective opposite sides of the plane 5, relative to which they are mutually symmetrical. Each of the rims 7 is flat and connected to the central strip 6 by a respective longitudinal bend 8 which is rounded in the form of a circular arc.

To be more precise, the central strip 6 has two mutually parallel and mutually opposed plane faces 9, 10 both of which are perpendicular to the plane 5, with respect to which they are respectively symmetrical, and the two faces 9 and 10 have a rectangular shape with a longitudinal dimension very much greater than the transverse dimension. The face 9 that faces away from the rims 7 is adapted to transmit electricity by electrical conduction from the rail 1 which is fixed to the ground, not shown, via electrically insulative supports, also not shown but familiar to the skilled person, to a mobile which moves longitudinally, i.e. parallel to the rail 1, and which is shown schematically in FIG. 7 by a shoe 11 pressed flat onto the face 9, along which the shoe 11 slides longitudinally as the mobile moves. The face 10 is adapted to rest flat against a plane electrically conductive face 13 of the body 3 when the rail 1 is finished, to assume a relationship of electrical conduction with that face 13, under conditions that emerge hereinafter.

The rims 7 project relative to the face 10 of the central strip 6 and converge in the direction away from the face 10 in a transverse direction 16 in the plane 5. Each of them has a respective plane face 14, 15, respectively facing away from and toward the plane 5, respectively connected to the face 9 or the face 10 by a circular arc-shaped rounded portion (no reference number), at the level of the corresponding bend 8, and the two faces 14, and likewise the two faces 15, converge in the direction away from the central strip 6 in the direction 16. At the greatest distance from the central strip 6 in the direction 16 the two plane faces 14 and 15 of each rim 7 are connected together by a respective plane longitudinal edge 18 substantially perpendicular to the two faces 14, 15 of the respective corresponding rim 7. The edges 18 therefore define for each of the rims 7 a respective longitudinal rectilinear free edge delimiting the faces 14 and 15 of the rim 7, and more generally the rim as a whole, on the side opposite its connection to the central strip 6, and the edge where they connect to the respective face 15 constitutes the area of the corresponding rim 7 nearest the plane 5.

As emerges hereinafter, the faces 15 that face toward the plane 5 define a respective attachment face for attaching the wear plate 2 to the mounting body 3 and it should be noted that each of them defines a hook-shape in conjunction with the face 10 of the central strip 6.

The wear plate 2 has the transverse profile defined by the central strip 6 and the rims 7 as just described throughout its longitudinal dimension and between two plane transverse end faces 19, except that in the embodiment shown, and in a manner that is not related to the present invention, the face 9 is connected to each of the faces 19 by a respective end transverse bevel or chamfer 20.

L1 designates the longitudinal dimension or length of the wear plate 2 between its transverse end faces 19, $\alpha_1$ designates the angle defined by each of the attachment faces 15 with the electrically conductive face 10 of the wear plate 2, $p_1$ designates the distance or depth in the direction 16 between the face 10 and a longitudinal edge (no reference number) where each face 15 is connected to the edge 18 of the corresponding rim 7, $p_2$ designates the distance or depth in the direction 16 between the face 10 and a longitudinal edge (no reference number) where each face 14 is connected to the edge 18 of the rim 7, the depth $p_2$ being greater than the depth $p_1$, $e_1$ designates the thickness of the wear plate 2, which thickness $e_1$ is identical for the central strip 6, the rims 7 and the bends 8 connecting the rims 7 to the central strip 6, and $l_1$ designates the minimum inside width of the central strip 6, i.e. the dimension perpendicular to the plane 5 between the longitudinal edges connecting each face 15 to the edge 18 of the respective corresponding rim 7. The angle $\alpha_1$ is less than 90°, for example of the order of 70°, but other values could be chosen without departing from the scope of the present invention.

Figure 4:
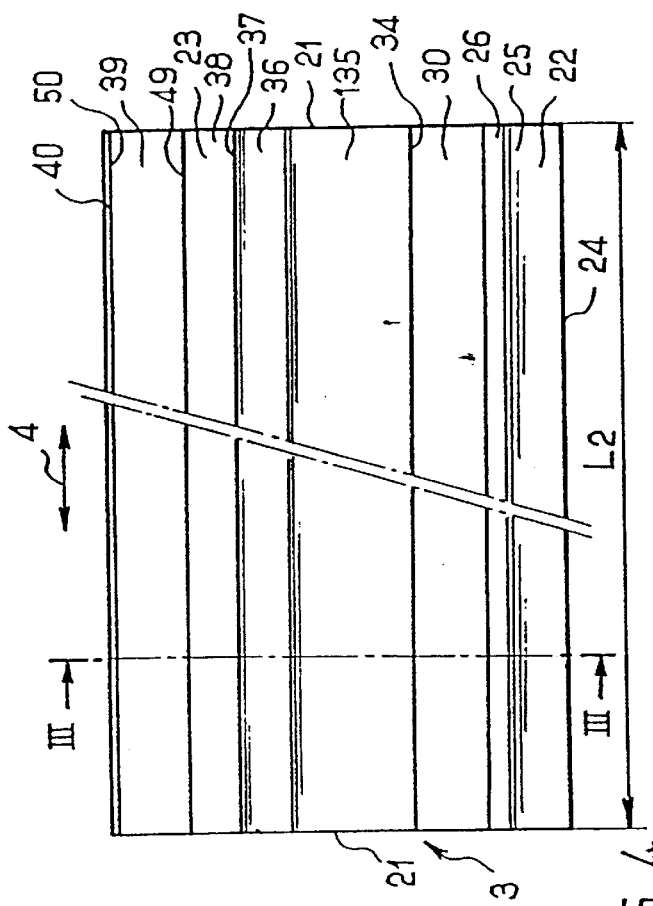
FIG. 4 is a lateral elevation view of the mounting body as seen in the direction of the arrow IV in FIG. 4.
Figure 3:
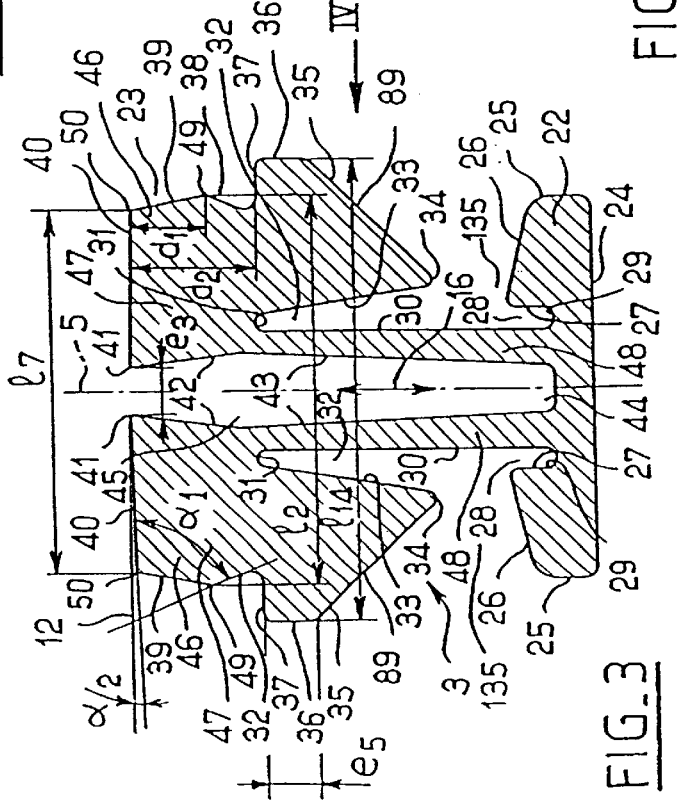
FIG. 3 shows a mounting body in accordance with the invention, as fabricated, i.e. in its rest configuration, in cross section taken along the line III—III in FIG. 4.

Reference is now made to FIGS. 3 and 4 in particular, which show the mounting body 3 in a rest configuration, i.e. as fabricated, in particular by extrusion, in one piece, from aluminum or aluminum alloy, or by any appropriate method known in the art from any appropriate electrically conductive material.

In particular when it occupies this rest configuration, the mounting body 3 has a constant cross section between two plane transverse end faces 21 between which it has a longitudinal direction or length L2 which is preferably slightly greater than the length L1, although the difference between these two lengths is negligible compared to their respective values; by way of non-limiting example, the length L2 can be 12 000 mm and the length L1 can be 11 990 mm.

The cross section is conformed to define in the mounting body 3 two parts which are mutually opposed in the direction 16, namely a longitudinal mounting base 22 for mounting it on a support such as a group of insulators attached to the ground, in a manner that is not shown but which is identical in the case of the present invention and in the case of a prior art electrical power supply rail, and a longitudinal head 23 which receives the wear plate 6, which head is elastically compressible perpendicularly to the plane 5 by flexing elastically relative to the base 22.

The conformation of the base 22 is immaterial insofar as the present invention is concerned, provided that the base 22 is rigid. In the non-limiting example shown, it has opposite the head 23, in the direction 16, a rectangular plane longitudinal face 24 perpendicular to the plane 5, which it straddles symmetrically, and the face 24 is delimited in the direction away from the plane 5 by connections with two plane edges 25 parallel to the plane 5 and symmetrical to each other with respect to it. The two edges 25, facing away from the plane 5, connect the face 24, on the same side as the head 23, to a respective plane face 26 which, from the point at which it is connected to the corresponding edge 25, diverges progressively from the face 24 in the direction toward the plane 5, relative to which the two faces 26 are symmetrical to each other. The faces 26 define in conjunction with the face 24 and the edges 25 a holding profile for holding members, not shown, for connecting the rail to the insulative supports, also not shown.

In the direction toward the plane 5, which it does not reach, each face 26 is connected to a longitudinal flank 27 of a respective longitudinal groove 28 whose flank 27 is plane, parallel to and faces the plane 5. Each flank 27 has a respective bottom 29, which advantageously has a semicircular cross section, which closes the groove 28 in the direction toward the face 24 in the direction 16, and each flank 27 is connected to another flank 30 of the same groove 28, which flank 30 is also plane, parallel to the plane 5 in the rest configuration of the mounting body 3 and extends beyond the flank 27 in the direction away from the face 24 in the direction 16, until it connects to a longitudinal bottom 31 of another respective longitudinal groove or slot 32 directly facing the corresponding groove 28 in the direction 16, in the sense that the bottoms 29, 31 of a groove 28 and a groove or slot 32 on the same side of the plane 5 as the latter directly face each other in the direction 16.

Each bottom 31 advantageously has a circular arcshaped cross section subtending an angle of slightly less than 180° and connects the flank 30 of the corresponding groove or slot 32 to another longitudinal flank 33 thereof, which flank 33 is plane, faces toward the plane and diverges progressively from that plane in the direction toward the face 24 in the direction 16, so that the groove or slot 32 is open toward the base 22 in the direction 16.

Each flank 33 also extends toward the face 24 in the direction 16 as far as a longitudinal rectilinear edge 34; the edge 34 faces the face 26 on the same side of the plane 5, without coming into contact with that face 26, regardless of the configuration of the mounting body 3, the configurations of which are described later, in order to leave a continuous space 135 between the edge 34 and the corresponding face 26, regardless of the configuration.

Each edge 34 connects the corresponding flank 33 to a respective longitudinal plane beveled face 35 at approximately 45° to the plane 5, from which it diverges in the direction away from the face 24 in the direction 16, until it is connected to a flat 36 approximately parallel to and facing away from the plane 5.

In the direction away from the face 24 in the direction 16 each flat 36 is connected to a longitudinal flat 37 approximately perpendicular to the plane 5, facing away from the face 24 in the direction 16 and located at approximately the same level in that direction as the bottom 31 of the grooves or slots 32.

Accordingly, relative to the areas of the body 3 which directly adjoin it both in the direction toward the face 24 and in the direction away from it, in the direction 16, i.e. relative to the corresponding beveled face 35 and relative to the corresponding flat 37, each flat 36 forms a projection in the direction away from the plane 5. The dimension $e_5$ of each flat 36 between the points (no reference number) where it is connected to the beveled face 35 and the respective corresponding flat 37, as measured in the direction 16, can be varied according to the configuration of the mounting body 3, the configurations of which are described later, but the variations allowed are sufficiently small to be ignored in the context of the present description.

Each flat 37 connects the corresponding flat 36, in the direction toward the plane 5, to a longitudinal flat 38 which faces away from the plane 5, from which the flat 38 diverges from the point at which it is connected to the flat 37, in the direction away from the face 24 in the direction 16, until it is connected by a longitudinal rectilinear edge 49 to a plane longitudinal facet 39 which also faces away from the plane 5 but whose oblique relationship to the latter is the reverse of that of the flat 38, with the result that the facet 39 converges toward the plane 5 in the direction away from the face 24 in the direction 16 and the flat 38 is set back relative to the facet 39 in order to attach one of the rims 7 of the wear plate 2 by means of the corresponding attachment face 15, as becomes apparent later; note that the flat 38 which is set back is also set back toward the plane 5 relative to the corresponding flat 36 because of the presence of the flat 37.

In the direction away from the face 24 in the direction 16, each facet 39 connects the flat 38 to a longitudinal plane end face 40 which is approximately perpendicular to the plane 5 and faces away from the face 24 in the direction 16. However, in the rest configuration shown in FIG. 3, the face 40 diverges progressively from the face 24 toward the plane 5 in the direction 16, forming relative to a longitudinal geometrical plane 12 perpendicular to the plane 5 an angle $\alpha_2$ close to zero, for example of the order of 1°. The facet 39 is connected to the end face 40 along a longitudinal rectilinear edge 50.

In the direction toward the plane 5, the face 40 is connected by a longitudinal rectilinear edge 41 to a plane longitudinal face 42 that faces toward the plane 5 and diverges from it toward the face 24 in the direction 16. The face 42 extends as far in the direction 16 as an intermediate level between the levels where the flat 38 is connected to the flat 37 and to the facet 39, respectively, i.e. to a distance from the face 25 slightly greater than that between it and the bottom 31 of the groove or slot 32 in the direction 16.

In the direction toward the face 24 in the direction 16, each face 42 is connected to a plane longitudinal face 43 which converges with the plane 5 in the direction toward the face 24 in the direction 16 and is connected at a distance from the face 24 in the direction 16 which substantially corresponds to the distance between the face 24 and the bottom 29 of each groove 28, by a circular arc-shape transition, to a plane longitudinal face 44 perpendicular to the plane 5, which the face 44 straddles in order to connect together the two faces 43 so that the faces 42, 43 and 44 define a longitudinal slot 45 in the mounting body 3. The face 44 defines the bottom of the slot 45, which is open in the direction away from the face 24 in the direction 16, between the edges 41, and extends from one to the other of the end faces 21 of the mounting body 3. The slot 45 divides the head 23 in the plane 5 into two halves 46 which are symmetrical to each other with respect to the plane 5 and each of which is defined, on a respective side of that plane, by the flank 30, the bottom 31 and the flank 33 of the groove or slot 32, open toward the base 22 in the direction 16, by the face 35, the flat 36, the flat 37, the recessed flat 38, the facet 39, the end face 40 and the faces 42 and 43, the two half-heads 46 defined in this way being connected together by the rigid base 22 which is in turn defined by the face 24, the edges 25, the faces 26, the flanks 27 and the bottoms 29 of the grooves 28.

For each half-head 46 the flank 33, the face 35, the flat 36, the flat 37, the recessed flat 38, the facet 39, the face 40 and the face 42 define a free end part or rigid end part 47 on the same terms as the base 22 and the flank 30 and the face 43 define between the rigid end part 47 and the rigid base 22 an intermediate part 48 connecting them together and defining a weakened area, compared to them, of privileged elastic flexing of the respective half 46 of the head from the rest configuration shown in FIGS. 3 and 5, in particular toward the plane 5 and toward the other half-head 46, to a maximum elastically flexed configuration shown in FIG. 6, in which the two half-heads come into mutual abutment in the plane 5 at the edges 41.

In this maximum elastically flexed configuration, in which the symmetry of the half-heads 46 relative to the plane 5 is preserved, the slot 45, which is then closed in the direction away from the base 22 because of the mutual contact of the edges 41, is comparatively shrunk and the faces 43 are approximately parallel to the plane 5, whereas the faces 42 converge in a more pronounced manner toward the plane 5 in the direction away from the base 22 in the direction 16. What is more, in this maximum elastically flexed configuration, the orientation of the end faces 40 of the half-heads 46 is reversed compared to their orientation in the rest configuration, in the sense that the faces 40 are inclined so that they converge toward the base 22 in the direction toward the plane 5 in the direction 16; however, their orientation relative to the face 42 of the same half-head, the facet 39, the recessed flat 38, the flat 37, the flat 36, the face 35 and the flank 33 of the same half-head 46 remains unchanged, because of the rigidity of the end part 47.

Note that, in this preferred embodiment, each intermediate part 48 becomes progressively thinner perpendicularly to the plane 5 from the point at which it is connected to the base 22 to the point at which it is connected to the respective end part 47, so that elastic flexing is privileged in the immediate vicinity of the connection of each intermediate part 48 to the corresponding end part 47.

The skilled person will readily understand that the change from the rest configuration shown in FIGS. 3 and 5 to the maximum elastically flexed configuration in the direction of movement toward each other of the two half-heads 46, shown in FIG. 6, and conversely by elasticity of the intermediate parts 48 in particular, is accompanied by a passage through a particular intermediate configuration of the body 3, shown in FIG. 7, in which configuration the mutual symmetry of the two half-heads 46 relative to the plane 5 is preserved and the edges 41 are still separated, although they are nearer the plane 5 than in the rest configuration. In this intermediate configuration, the two end faces 40 are mutually coplanar, perpendicular to the plane 5, and form respective halves, separated by the slot 45, of a common plane face which is the electrically conductive face 13 of the body 6 facing toward the wear plate 2, i.e. the face 13 onto which the electrically conducting face 10 of its central strip 6 of the wear plate 2 is pressed flat, when the rail 1 is completed by assembling together the wear plate 2 and the mounting body 3. The profile of each end part 47 naturally remains unchanged in this intermediate configuration, compared to the rest configuration and the maximum elastically flexed configuration.

In this intermediate configuration, when the rail 1 is finished, the rebates 38 on respective opposite sides of the face 13 fasten the rims 7 of the wear plate 2 and to this end the attachment face 15 of each rim 7 is pressed flat against a respective flat 38, i.e. an area of the flat 38 directly adjacent its connection to the facet 39; the part of the flat 38 directly adjacent the flat 37 preferably remains free, to prevent contact between the edge 18 of each rim 7 and the flat 37, in particular when fitting the wear plate 2 to the mounting body 3, with the mounting body 3 in its maximum elastically flexed configuration in which the flats 37 diverge progressively from the face 24 in the direction away from the plane 5 in the direction 16 (see below). Accordingly, when the rail 1 is finished, there exists between each edge 18 and the corresponding flat 37 a clearance in the direction 16 which is permanent, i.e. which is present regardless of dimensional tolerances and dimensional variations caused by thermal expansion of the wear plate 2 and the mounting body 3, which achieves a permanent cam effect between the attachment faces 15 and the flats 38 because of their orientation relative to the plane 5 and the tendency of the mounting body 3, which at this stage is held in said intermediate configuration exclusively by the half-heads 46 bearing against the rim 7 of the wear plate 2 in the direction away from the plane 5, to resume its rest configuration because of its elasticity, the result of which is to press the electrically conductive face 10 of the central strip 6 of the wear plate 2 against the coplanar end faces 40 of the half-heads 46, regardless of the dimensional tolerances and the dimensional variations caused by thermal expansion of the wear plate 2 and the mounting body 3.

To enable the wear plate 2 to be attached to the mounting body 3 under such conditions, the angle $\alpha_1$ between each recessed flat 38 and the end face 40 of the same half-head 46 naturally applies, regardless of the configuration of the body 3 by elastic flexing, the edge 49 connecting each flat 38 and the corresponding facet 39 is at a distance $d_1$ less than the depth $p_1$ from the face 40 of the same half-head 46, to which it is perpendicular, and the flat 37 is at a distance $d_2$ from the face 40, as measured perpendicularly to that face, greater than the depth $p_2$. The distances $d_1$ and $d_2$ naturally do not vary when the body 3 flexes elastically.

In contrast, the separation of the edges 49 connecting each facet 39 to the flat 38 of the same halfhead 46, perpendicularly to the plane 5, varies with the configuration that the body 3 assumes by flexing elastically.

Accordingly, in the rest configuration shown in FIGS. 3 and 5, that separation has a value $l_2 > l_1$ although, in the maximum elastically flexed configuration shown in FIG. 6, that separation has a value $l_3$ at most equal to $l_1$ and preferably slightly less than $l_1$, by 1 to 2 mm, for example. In contrast, in the particular intermediate configuration shown in FIG. 7, the value $l_4$ of the separation, which is between the values $l_2$ and $l_3$, is again greater than $l_1$ and in practice equal to the unmarked distance between the attachment faces 15, as measured perpendicularly to the plane 5, at a distance from the face 10 of the central strip 6 of the wear strip 2, as measured perpendicularly to the face 10, equal to the distance $d_1$ between each edge 49 of the end face 40 of the same half-head 46, because each flat 38 is pressed flat against a respective attachment face 15 in this configuration once the rail 1 is finished. In this configuration, the respective connections (no reference number) of the recessed flats 38 to the corresponding flats 37 are mutually spaced perpendicularly to the plane 5 by a distance $l_{11}$ less than $l_1$.

Thus if the respective transverse profiles of the body 3 in its rest configuration and the wear plate 2 are superposed, as shown in FIG. 5, overlapping is observed of an area of each half-head 46 located in the vicinity of the edge 49 and along the area of the corresponding flat 38 adjacent the edge 49 by a respective rim 7, and more precisely by a portion of the edge 18 thereof and by an area thereof situated along the attachment face 15, adjacent the edge 18, given that the body 3 and the wear plate 2 are assumed to have the same median longitudinal plane of symmetry 5. The mean value of this overlap, as measured perpendicularly to the flat 38 or the face 15, is marked $e_2$ in FIG. 5; by way of non-limiting example, it can be from 1 to 2 mm, given that it is cancelled out when the mounting body has the predetermined configuration shown in FIG. 7, and that the overlap is replaced by a clearance when the mounting body 3 is in the maximum elastically flexed configuration shown in FIG. 6.

Note that the value $e_3$ of the mutual separation of the edges 41 perpendicular to the plane 5 in the rest configuration can be predetermined, the value 13 being approximately equal to the value $l_2$ minus $e_3$; in the particular intermediate configuration of the body 3, shown in FIG. 7, their mutual separation has a value $e_4$ less than the finite value $e_3$.

Similarly, the distance perpendicular to the plane 5 between the edges 50 connecting each facet 39 to the face 40 of the same half-head 46 varies according to the configuration of the body 3 so that, in the rest configuration shown in FIG. 7, it has a value $l_5$ at most equal, and preferably substantially equal, to the width $l_6$ of the face 10 of the central strip 6 of the wear plate 2 perpendicularly to the plane 5 between the bends 8, i.e. between its respective arcuate connections to the attachment faces 15. In practice, the value of $l_6$ can be substantially identical to the value of $l_1$. For $l_5$ to have a value of this kind, the edges 50 are mutually spaced perpendicularly to the plane 5 in the rest configuration shown in FIG. 3 by a distance $l_7$ whose value is greater than the value of $l_5$ in the same proportions as the value of $e_3$ is greater than the value of $e_4$ and the value of $l_2$ is greater than the value of $l_4$. What is more, the distance $d_1$ between each edge 49 and the end face 40 of the same half-head 46 is made greater than the distance $d_3$ between the face 10 of the central strip 6 of the wear plate 2 and each of the attachment faces 15 at the level of the corresponding bend 8, i.e. at the level of its arcuate connection to the face 10. Thus in the configuration shown in FIG. 7 the facets 39 do not interfere with the arcuate connections of the connecting faces 15 to the face 10.

Under these conditions, the rail 1 shown in FIG. 7 can be fabricated in the manner now to be described with reference to FIGS. 8 to 22.

Firstly, the mounting body 3 is prefabricated in its rest configuration, for example by extruding it in one piece from aluminum or aluminum alloy, and the wear plate 2 is prefabricated in its final configuration, for example by profiling a stainless steel strip or a strip of copper or a copper alloy such as brass.

The mounting bodies 3 and the wear plates 2 prefabricated in this way are brought separately to an installation 51 for assembling them together to form the rails 1. FIG. 8 shows one non-limiting example of an installation 51 that can be provided in a production shop. FIG. 8 shows the longitudinal direction 4, which is now horizontal, that will continue to be used as a reference given that the mounting bodies 3, the wear plates 2, and the finished rails 1 retain this longitudinal direction 4 before, during and after assembly.

The installation 51 shown diagrammatically in FIG. 8 includes, in longitudinal succession in the direction 4:

a table 52 for individually feeding mounting bodies 3 in the rest configuration and with an orientation such that the face 24 of the base 22 of each mounting body 3 faces downwards and rests on horizontal transport idler rollers 153 for conveying them in the direction 4 and in which the head 50 faces upward, the feed table 52 being flanked laterally by a table 53 for storing waiting mounting bodies 3, which are already correctly oriented;

a station 54 for assembling together each mounting body 3, introduced successively via the feed table 52, and a respective wear plate 2, the wear plates 2 awaiting assembly being stored on a storage table 55 disposed laterally relative to the station 54, with an orientation such that the edges 18 of the rims 7 rest on the table 55 and the face 9 of the central strip 6 faces upward; and a station 56 for packaging the finished rails 1 fed one by one from the station 54 in the direction 4, preferably in a head-to-tail arrangement.

The successive mounting bodies 3 are individually conveyed from the station 52 to the station 54 by two groups 57, 58 each of two rollers 59, 60 in succession in the direction 4 between the stations 52 and 54. The rollers are driven in rotation about a respective vertical axis 61, 62 by a motor 63 and press against respective edges 25 of the base 22. An identical group 64 of two rollers is disposed between the stations 54 and 56 in the direction 4 to convey the finished rails 1 from the station 54 to the station 56, also by virtue of bearing against the edges 25 of the base 22. The three groups 57, 58, 64 are identical, and for this reason only one of them is shown in FIG. 10, it being understood that the rollers of the two groups 57 and 58 are driven by a common motor 63.

A device 65 for brushing and greasing the faces 40, the facets 39 and the recessed flats 38 of the body 3 in its rest configuration is disposed between the two groups 57 and 58 in the direction 4, greasing being effected with a contact grease adapted to encourage subsequent electrical conduction at least between the faces 40 of the face 10 of the wear plate 2 and preferably also between the recessed flats 38 and the attachment faces 15.

To this end, the device 65 includes three rotary brushes 66, 67, 68. The brush 66 is disposed above the trajectory of the faces 40, over the width 17 and with equal lengths on respective opposite sides of the trajectory of the plane 5, and has a horizontal axis 69 around which it is driven in rotation so that its part in contact with the faces 40 moves in the opposite direction to them. The other two brushes 67, 68 are on respective opposite sides of the trajectory of the mounting body 3 at the level of the facets 39 and the recessed flats 38 and have a respective vertical axis 70, 71 about which they are driven in rotation so that they come into contact with the facet 39 and the recessed flat 38 of a respective half-head 46 on moving in opposite directions. The construction of the station 65 is not described in more detail and will be obvious to the skilled person anyway.

On reaching the station 54, after having the faces 40, facets 39 and recessed flats 38 brushed and greased in this way, each successive mounting body 3 rests with the downturned face 24 of its base 22 on a horizontal table 72 on which it is longitudinally and transversely immobilized in a particular position by virtue of one of the edges 25 of the base 22 bearing against stops 73 fixed to the table 72 and distributed longitudinally along the edge 25, and by mobile stops 74 facing the fixed stops 73 in the horizontal and transverse directions and pressed against the other edge 25 by respective actuators 75 adapted to move the stops 74 horizontally toward the stops 73 to immobilize an attachment body 3 by clamping its base 22 or in the direction away-from the stops 73 to release the mounting body 3, in particular so that it can move in translation in the direction 4.

The table 72 can be plane, but it will be obvious to the skilled person that it can also have a longitudinal curvature which it communicates to the mounting body 3 when it is immobilized on it between the stop 73 and 74, that curvature being such that when the base 22 of the rail 1 has been mounted on insulative supports, generally in an orientation in which the base 22 faces upward and its face 24 is horizontal, the curvature that the rail 1 naturally assumes between the mounting supports, because of its weight, cancels the initial curvature so that the initially curved rail 1 becomes straight. The curvature to be imparted to the basic body 3 for this purpose at the station 54, and consequently also to the wear plate 2 after they are assembled together, can easily be determined by the skilled person, in particular according to the distance between two mounting supports of the rail 1.

Only in two sets of the fixed stops 73 associated with a mobile stop 74 are preferably provided, disposed to operate in the vicinity of the end faces 21 of the mounting body 3; however, given the longitudinal dimensions of the mounting body, which is of the order of 12 meters, for example, other fixed stops 76 are arranged longitudinally at the station 54. The same edge 25 bears against them as bears against the stops 73, as can be seen in FIG. 13.

Once it has been immobilized in this way at the station 54, each mounting body 3 undergoes a number of successive operations that are described now with reference to FIGS. 12 and 14 to 20.

As shown in FIG. 12, at predetermined locations in the vicinity of each of the faces 21 in the longitudinal direction 4, boring devices 77 are mounted under the table 72 and comprise, for example, two groups each of two drills 78 which are symmetrical to each other with respect to the trajectory of the plane 5 and mounted to rotate about a respective vertical axis 79 relative to a common carriage 80 adapted to move upward and downward under the table 72, in a controlled manner, to bore into the base 22 two groups of two vertical axis threaded holes symmetrical to each other with respect to the plane 5, to enable subsequent fishplate joints between the mounting bodies 3 of two longitudinally juxtaposed rails 1, on the site of use, to ensure mechanical and electrical continuity between them. The construction of each device 77 will be evident to the skilled person and is not described further. The boring operation is not characteristic of the present invention.

In contrast, FIGS. 14 to 20 show the assembly of the wear plate 2 to the mounting body 3 at the station 54, which is characteristic of the present invention.

The station 54 has, throughout the longitudinal dimension $L_2$ of the mounting body 3, a respective rectilinear bar 81, or a respective succession of longitudinal bars 81, each of which corresponds to a portion of the longitudinal dimension $L_2$, but which can be considered as a respective unique bar, facing the trajectory of each of the flats 36 of the mounting body 3 in the rest configuration, on respective opposite sides of the trajectory of the plane 5 and symmetrically with respect to that trajectory. Each of the bars 81 or like successions of bars is supported by a respective group of actuators 82 distributed along the longitudinal dimension $L_2$ and adapted to move the two bars 81 or like successions of bars synchronously in a transverse horizontal direction toward or away from the trajectory of the plane 5, in either case preserving the mutual symmetry of the bars 81 or like successions of bars with respect to that trajectory. The bars 81 or successions of bars are advantageously flexible in the horizontal plane and their connections to the actuators 82 allow limited clearance in the longitudinal direction to allow the actuators 82 to flex the bars 81 or successions of bars in said horizontal plane.

The bars 81 or like successions of bars can therefore evolve between a position of maximum mutual spacing perpendicular to the trajectory of the plane 5, in which the distance $l_{12}$ between them is greater than the distance $l_{14}$ between the flats 36, perpendicular to the plane 5, when the mounting body 3 is in its rest configuration, as shown in FIG. 20, and a position of maximum closeness perpendicularly to the trajectory of the median plane 5, in which position the value $l_{13}$ of the distance between them perpendicularly to that trajectory is less than the value $l_9$ of the distance between the flats 36 perpendicularly to the plane 5 in the predetermined intermediate configuration shown in FIG. 7, and corresponds to the value 110 which must be imparted to this distance between of the flats 36 perpendicularly to the plane 5 to place the mounting body 3 in the maximum elastically flexed configuration shown in FIG. 6, i.e. so that the two half-heads 46 just abut against each other in the plane 5 at their edges 41 without pushing the half-heads 46 any farther toward each other.

The bars 81 or like successions of bars occupy their farthest apart position, shown in FIG. 20, during the feeding of a mounting body 3 in its rest configuration to the station 54 from the feed table 52, and are returned to their closest together position only after the base 22 of the mounting body 3 has been immobilized by means of the stops 73 and 74.

Once the base 22 has been immobilized and bored, as shown in FIG. 12, the actuators 82 are operated to move the bars 81 or like successions of bars progressively from the farthest apart position to the closest together position, which applies to each of the half-heads 46, through the respective corresponding flat 36, a thrust in the direction toward the plane 5. That thrust causes progressive elastic flexing of each of the half-heads 46, at the level of the corresponding intermediate part 48, until the edges 41 bear against each other in the plane 5, i.e. until the body 3 has the maximum elastically flexed configuration shown in FIG. 6.

The movement toward each other of the bars 81 or like successions of bars is then stopped, but the pressure is maintained in the actuators 82 so that they continue to apply the thrust to the flats 36 in order to retain the body 3 in its maximum elastically flexed configuration, as shown in FIG. 14.

Then, as also shown in FIG. 14, an appropriately controlled lifting device, not shown, picks up a wear plate 2 from the storage table 55, for example by means of an electromagnet 83 applied to the face 9 of the central strip 6 if the wear plate 2 is made of stainless steel, and places the wear plate 2 it has picked up on top of the mounting body 3, in an orientation in which the rims 7 face downward and the respective median planes of the wear plate 2 and the mounting body 3 coincide, and at a level such that the edges 18 of the rims 7, which are facing downward, are at a higher level than the end faces 40 of the half-heads 46 of the body 3. Then, maintaining this orientation of the wear plate 2 relative to the mounting body 3, if necessary with the aid of appropriate guide devices, not shown, the design of which will be obvious to the skilled person, the lifting device progressively lowers the wear plate 2 toward the mounting body 3 and, because the mounting body is in its maximum elastically flexed configuration, shown in FIG. 6, in which the edges 49 are spaced by a distance $l_3$ less than the distance $l_1$ between the edges 18 of the rims 7, the rims pass beyond the edges 49 during this downward movement of the wear plate 2, after which the wear plate rests with the face 10 of its central strip 6 on the faces 40, or to be more precise on the edges 50 connecting the faces 40 to the facets 39, given the orientation of the faces 40 at this time. FIG. 15 shows this final stop of lowering the wear plate 2 onto the mounting body 3. Note that the facets 39, which are inclined so that they converge toward the plane 5 in the direction away from the face 24 in the direction 16, which convergence is accentuated in this configuration of maximum elastic flexing compared to the rest state of the body 3, facilitates interengagement of the rims 7 with respective opposite sides of the head 50 and then movement beyond the edges 49 during the downward movement just described.

The bars 81 preferably have a height or thickness (no reference number) at most equal to the dimension $e_5$ of the flats 36, so that they can be pressed against them without projecting above them, i.e. with no risk of impeding the downward movement through untimely contact with the rims 7.

Then, as shown in FIG. 16, after the electromagnet 83 has been deactivated, the lifting device raises the electromagnet but the wear plate 2 remains on the mounting body 3 which continues to be held by the actuators 82 and the bars 81 in its maximum elastically flexed configuration.

FIGS. 17 and 18 show two longitudinal positions of the wear plate 2 relative to the mounting body 3 at the end of this step of depositing the wear plate 2 on the mounting body 3. In FIG. 17 it has been deposited so that the wear plate 2 is longitudinally centered relative to the mounting body 3, i.e. each end face 19 of the wear plate 2 is set back longitudinally by the same distance, equal to half the difference between the dimensions L1 and L2, relative to a respective end face 21 of the mounting body 3. FIG. 18 shows a position in which one of the faces 19 is coplanar with one of the faces 21 and the other face 19 is set back relative to the other face 21 by a longitudinal distance corresponding to the entire difference between the dimensions L1 and L2. In both cases, the dimension $L_2$, which is greater than the dimension $L_1$, is the length of the finished rail 1.

During a subsequent step, shown in FIG. 19, the wear plate 2 is pressed against the edges 50 connecting the faces 40 and the facets 39 while the body 3 is held in its maximum elastically flexed configuration. To this end a carriage, not shown, of the station 54 moves longitudinally in a first direction 84 over the combination of the mounting body 3 and the wear plate 2. The carriage carries a roller 86 which can rotate freely about a horizontal transverse axis 85 and whose bottom generatrix is pressed against the face 9 of the central strip 6 of the wear plate 2, for example by spring means, not shown, or by virtue of its own weight. The roller 86 then travels in the direction 84 along the face 9 of the central strip 6 of the wear plate 2, from one of the bevels 20 to the other one.

Then, as shown in FIG. 20, the roller 86 is moved back in the direction 87 opposite the direction 84 from one of the bevels 20 to the other one and, as it performs this movement, the pairs of actuators 82 it successively passes are activated to return the bars 81 progressively to their farthest apart position, subject to flexing of the bars 81 or successions of bars in a horizontal plane, allowing the mounting body 3 to return progressively to its rest configuration.

However, during this return movement, the recessed flats 38 abut against the attachment faces 15 of the rim 7, in the direction away from the plane 5, until they are pressed flat against the attachment faces 15; because of the angle $\alpha_1$, the face 10 of the central strip 6 of the wear plate 2 is pressed flat against the end faces 40, which are coplanar at this time, to form the electrically conducting face 13 of the body 3 facing toward the electrically conducting face 10 of the wear plate 2. In other words, the wear plate 2 stops the mounting body 3 in the particular intermediate configuration shown in FIG. 7 during the return movement of the mounting body 3 toward its rest configuration, so that the mounting body 3 is held prestressed in elastic flexing between the rims 7 of the wear plate 2.

By way of non-limiting example, for an angle $\alpha_1$ of the order of 70°, good results have been obtained in tests with an aluminum mounting body 1 and a stainless steel wear plate 2 with the dimensions of the mounting body 1 chosen so that it applies to each rim 7, via the corresponding recessed flat 38, a force of 150 Newtons producing a pressure of 2.5 MPa.

This completes a rail 1, as shown in FIG. 21, and after its mounting body 3 has been released by appropriate movement of the mobile stops 74, the rail is taken up by the group 64 of drive rollers, which feed it to the packaging station 56 at which the successively finished rails 1 are preferably packaged head-to-tail as shown in FIG. 22. To this end, alternate rails 1 reaching the station 56 are turned over so that the rails 1 are stored on a plane horizontal table 88 of the station 56 in an orientation in which the face 24 of the base 22 rests on the table 88 and an orientation in which the face 9 of the central strip 6 of the wear plate 2 rests on the table 88, so that the successively fabricated rails 1 are juxtaposed on the table 88, parallel to each other, before they are packaged and then taken to a storage area or to the place of use.

Note that the wear plate 2 leaves completely uncovered an area of each end part 47 delimited by the flat 37, the flat 36, the face 35, the edge 34 and the flank 33 of the groove 32, which area takes the form of an extension 89 of the end part 47 along the intermediate part 48, toward the base 22 in the direction 16. The respective extension 89 does not come into contact either with the base 22 or with the intermediate part 48, enabling an insulative cover similar to those fitted to prior art electrical power supply rails to be attached to the base 22. This is not shown but will be evident to the skilled person.

Note also that despite the firm elastic attachment between the wear plate 2 and the mounting body 3, it remains possible afterwards to remove a worn or damaged wear plate 2 by again applying to the flats 36 of the mounting body 3 a thrust moving the two half-heads 46 into the position of maximum elastic flexing shown in FIG. 6, before fitting a new wear plate 2, which is fixed to the mounting body 3 by releasing the aforementioned thrust, although replacing a damaged or worn wear plate is generally impossible with the prior art electrical power supply rails, which must be replaced entirely if their wear plate is worn or damaged.

In this regard, it is particularly advantageous for each flat 36 to project relative to the respective adjoining areas of the rail 1 as a whole in the direction away from the plane 5 after fabricating the rail, i.e. after assembling and fastening together the wear plate 2 and the mounting body 3, as this enables accurate positioning of the means employed to apply the thrust, namely the bars 81 in the case of the installation 51 described with reference to FIGS. 8 to 22.

A worn or damaged wear plate can be replaced after demounting the rail 1 from its support on site and returning it to the shop, and to be more precise to the station 54 of the installation 51 where, after immobilizing the body 3 of the rail 1 in the manner described with reference to FIGS. 12 and 13, the thrust is applied to the two halves 46 of the head 23 to move them to the maximum elastically flexed configuration, as described with reference to FIG. 14, which releases the wear plate 2 from the mounting body 3. The worn or damaged wear plate 2 is then taken off and removed, for example by means of the electromagnet 83, after which, with the two halves 46 of the head 23 held in their maximum elastically flexed flexing position, a new wear plate 2 is nested over the head 23 of the body 3, in the manner described with reference to FIGS. 14 to 19. The thrust applied to the halves 46 of the head 23 is then progressively released to allow the head to return elastically to the rest configuration, during which movement it is stopped in its intermediate configuration prestressed in elastic flexing between the rims 7 of the wear plate 2, the return movement being performed under the conditions described with reference to FIG. 20 and reconstituting the rail 1 as shown in FIGS. 7 and 21 in particular. The renovated rail 1 is then released and brought back to its site of use to be replaced on its support via the mounting body 3, or taken to a storage area, awaiting allocation, if certain imperatives led to it being replaced with a new or renovated rail immediately after it was removed.

The need to remove from the rail from its support, to return it to the shop to renovate it, and then to return it to the site of use to replace it on the support constitutes a constraint that can be dispensed with by working on the site of use of the rail, with the body 3 of the rail fixed to its support.

To this end, a rigid beam can be mounted on a rail vehicle, on positioning means that will be evident to the skilled person, the beam essentially corresponding to the station 54 of the fixed installation 51 described with reference to FIG. 8 in particular and having means for immobilizing it in a precise position relative to the rigid base 22 of the mounting body 3, namely the equivalent of the table 72, the fixed stop 73 and 76 and the actuators 75 carrying the mobile stops 74, or any other suitable device, and bearing on the support of the rail, for example, as well as the actuators 82 carrying the thrust bars 81 facing the flats 36 when the beam is immobilized in said precise position relative to the base 22 of the mounting body 3 by the aforementioned means. The renovation method in accordance with the invention is then carried out simultaneously throughout the longitudinal dimension $L_2$ of the rail 1, namely throughout the respective lengths $L_1$ and $L_2$ of the wear plate and the mounting body 3, in the same way as the installation 51 described with reference to FIG. 8 applies the method of fabricating the rail 1 simultaneously throughout the longitudinal dimensions $L_1$ and $L_2$.

However, because of the overall size of the equipment employed, it is more convenient to carry out the renovation method in accordance with the invention on the site of use of the rail 1, whose mounting body 3 remains fixed to its support in its particular position of use, by carrying it out successively in longitudinally localized areas of the rail 1 in longitudinal succession in a given longitudinal direction, it being understood that this approach can also be adopted for fabricating the rail 1 in the first place, using the fabrication method previously described successively in longitudinally localized areas of the mounting body and the wear plate in longitudinal succession in a particular longitudinal direction.

This progressive working along the rail 1, or along its mounting body 3 and the wear plate 2, can easily be carried out using a carriage adapted to travel along the rail 1, or along its mounting body 3 and the wear plate 2, and to carry out locally some of the operations carried out simultaneously throughout the length of the rail 1, the mounting body 3 and the wear plate 2 at the station 54 of the installation 51.

Figure 24:
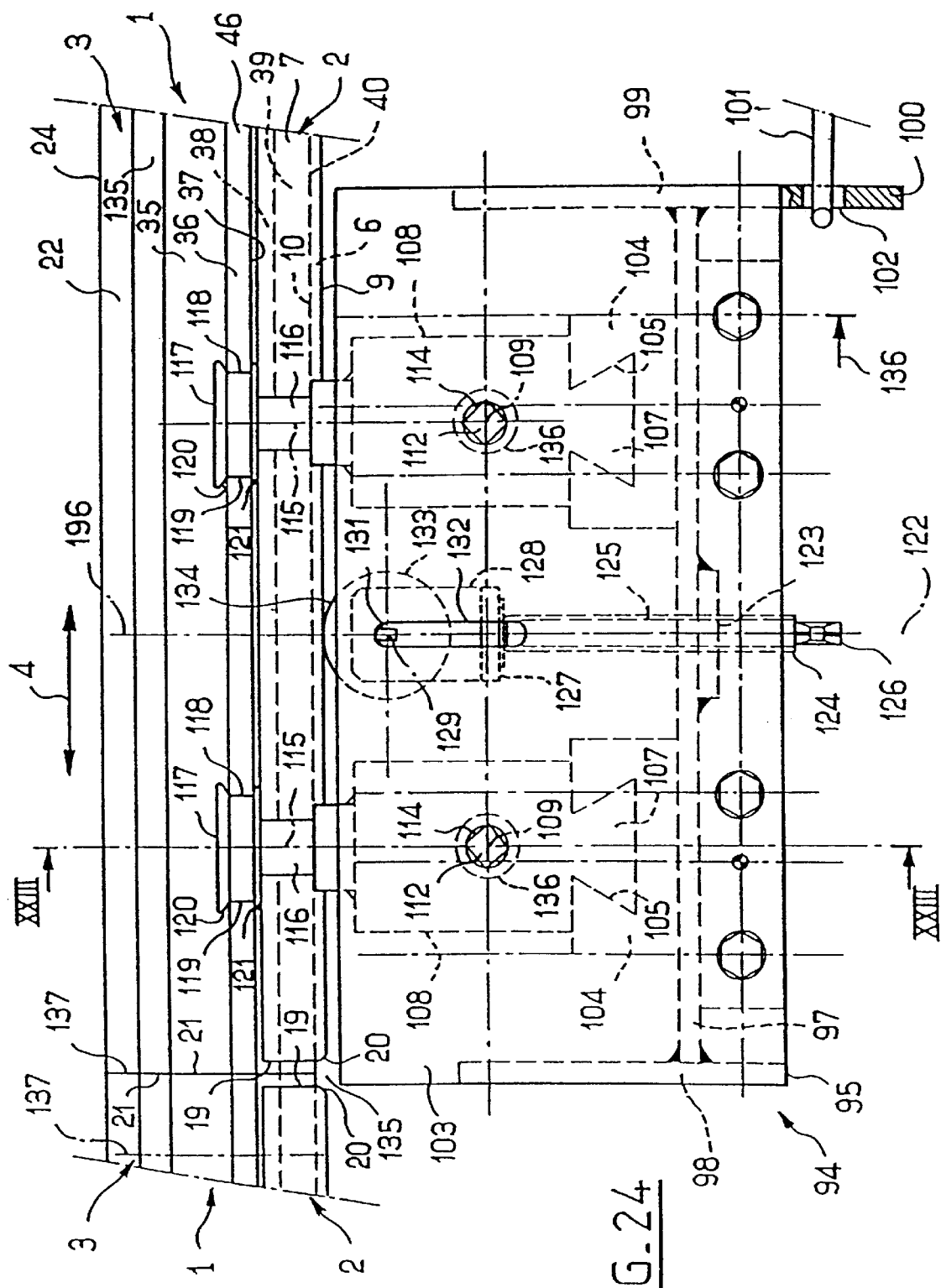

FIGS. 23 and 24 show one embodiment of a carriage for renovating a rail 1 on its site of use, with the mounting body 3 of the rail 1 immobilized relative to the ground by supporting brackets distributed along its longitudinal dimension, FIG. 23 showing one bracket 89 in its installation position on site.

The bracket 89 has a shape that is well known in itself in the art and is not described in detail. Suffice to say that it is generally angle-iron-shaped, is disposed in a median transverse plane relative to the rail 1 and has a vertical flange 90 which is disposed laterally relative to the rail 1 and is used to fix the bracket 89 to a post, not shown, fixed to the ground, also not shown, and a horizontal flange 91 which straddles the base 22 of the mounting body 3 and is disposed so that the plane 5 is approximately vertical and the head 23 and the wear plate 2 face downward; the base 22 is immobilized relative to the support 89 by virtue of being gripped between a jaw 92 permanently attached to the flanges 90 and 91 and a jaw 93 removably fastened to the jaw 92, the two jaws 92 and 93 co-operating with the base 22 of the mounting body 3 in a manner comparable to that of the fixed and mobile stops 73, 74 described with reference to FIG. 12. Note that the extension 89 of the rigid end parts 47 of the two halves 46 of the head 23 of the body 3 toward its base 22 is conformed and dimensioned, in particular with regard to its beveled face 35, so as not to come into contact with the jaws 92 and 93, which further leave uncovered at least the area of each beveled face 35 nearest the corresponding flat 46, as well as the flats 46 and all the areas of the rail 1 which are under them, given the position of the rail 1 when it is mounted at its site of use on brackets such as the bracket 89.

Given this position of use of the rail 1, the carriage 94 is disposed under the rail, from the mounting body 3 of which it is suspended by means also enabling it to move longitudinally, preferably by rolling, in a particular position of use which is shown in FIGS. 23 and 24 and is used as a reference in the remainder of the description of the carriage 94. The description also presupposes that the rail 1 is complete, in other words that the wear plate 2 is fixed to the mounting body 3, which corresponds to the condition of the rail 1 before renovation by changing its wear plate 2, for example.

The carriage 94 has a rigid chassis 95 the whole of which is at a lower level than the wear plate 2 of the rail 1 and takes the general form of a rectangular parallelepiped which is symmetrical with respect to a longitudinal plane coincident with the median longitudinal plane 5 of symmetry of the rail 1 and which is therefore also denoted by the reference numeral 5. The chassis 95 also has a transverse plane of symmetry 196, the expressions "longitudinal" and "transverse" relating to the longitudinal direction 4 of the rail 1.

To be more precise, in the embodiment shown, the chassis 95 is formed of an assembly of five flat rectangular metal plates, namely:

a longitudinal lateral wall 96, parallel to the plane 5 and directly under the flange 90, which is itself parallel to the plane 5, the wall 96 being dimensioned so as not to come into contact either with the flange 90 or with the post, not shown, carrying the bracket 89, and having a top longitudinal edge, a bottom longitudinal edge and two transverse edges (no reference number), a longitudinal bottom 97, perpendicular to the plane 5, which it straddles at a particular distance below the wear plate 2, the bottom 97 having a longitudinal edge bolted to the lateral wall 96 in the immediate vicinity of its bottom longitudinal edge, a longitudinal edge symmetrical to the first one with respect to the plane 5, and two transverse edges, none of these edges being designated by a reference number, a longitudinal lateral wall 103 identical to the lateral wall 96, with which it is symmetrical with respect to the plane 5, the wall 103 being bolted to the longitudinal edge of the bottom 97 opposite its edge bolted to the lateral wall 96 and having a top longitudinal edge and a bottom longitudinal edge (no reference number) at the same level as the top longitudinal edge and the bottom longitudinal edge, respectively, of the lateral wall 96 and two transverse edges (no reference number) in the same transverse plane, not shown, as the transverse edges of the lateral wall 96, and two transverse front walls 98, 99, each of which has four transverse edges (no reference number), namely two lateral edges freely joined to the respective lateral walls 96 and 103 along a respective transverse edge thereof, a top edge at a lower level than the top longitudinal edge of the lateral walls 96 and 103 and that of the wear plate 2 of the rail 1 when the carriage 94 is in use, but above that of the bottom 97, and a bottom edge in whose immediate vicinity the front wall 98, 99 is welded to the bottom 97 and which, with regard to the front wall 98, is at the same level as the bottom longitudinal edge of the lateral walls 96 and 103 and, where the front wall 99 is concerned, forms a downward projection relative to the bottom longitudinal edge of the lateral walls 96 and 103 so that the front wall 99 forms a transverse lug 100 under the bottom 97 for attaching a traction member 101, for example by means of a hole 102 formed in the lug 100 in the plane 5.

The lateral wall 96, the bottom 97 and the lateral wall 103 are respectively symmetrical with respect to the plane 196, with respect to which the front walls 98 and 99 occupy mutually symmetrical positions.

Toward the top, in positions that are mutually symmetrical with respect to the plane 196, the bottom 97 has two slideways 104 fastened to it, each of which is between a respective one of the front walls 98, 99 and the plane 196. The slideways 104 have at the top respective dovetail grooves 105 oriented in the same transverse direction 106 perpendicular to the plane 5 and each of the grooves 105 receives a respective dovetail tenon 107 of two sliders 108 which slide in the direction 106 and are disposed on respective opposite sides of the plane 5, toward or away from which the two sliders 108 can move in the direction 106, although they are not able to move in any other direction relative to the chassis 95 of the carriage 94.

Other embodiments of the chassis 95 of the carriage 94 could be chosen without departing from the scope of the invention, of course, and other means of guiding the sliders 108 when they slide in the direction 106, perpendicular to the plane 5, relative to the chassis 95 of the carriage 94 could be chosen without departing from the scope of the invention.

At an intermediate level between that of the bottom 97 of the chassis 95 and that of the top longitudinal edges of the lateral walls 96 and 103, the two sliders 108 corresponding to the same slideway 104 have respective threaded holes 110 along an axis 109 perpendicular to the plane 5, i.e. oriented in the direction 106, the two threads having the same pitch but opposite hands. Respective threads 111 of a common screw 112 along the axis 109 are engaged in the two threaded holes 110 of the sliders 108 corresponding to the same slideway 104, the two threads of the same screw 112 having the same pitch but opposite hands.

Each of the screws 112 is journaled in a respective bearing 135 coaxial with the lateral walls 96 and 103 in two end areas so as to be able to rotate freely about its axis 109 relative to the chassis 95, although it is prevented from moving relative to the chassis in any other direction, and in particular parallel to its axis 109, in the direction 106, through abutting engagement of a respective coaxial flange 136 of the screw 112 between and against the two lateral walls 96 and 103, so that the position of the sliders 108 corresponding to the same slideway 104 can be adjusted, in the direction toward or away from the plane 5 in the direction 106, by rotating the screw 112 one way or the other, but remain at all times mutually symmetrical with respect to the plane 5. In this regard, the screws 112 corresponding to the pairs of sliders 108 respectively associated with the slideways 104 are independent of each other, so that the sliders 108 corresponding to one of the slideways 104 can occupy a position relative to the plane 5 in which they are spaced differently to the sliders 108 corresponding to the other slideway 104.

The pitches of the threads 111 and the threaded holes 110 are preferably irreversible under normal conditions of use, to be described later, so that the position of the sliders 108 relative to the plane 5 is stable and can be modified only by intentional rotation of the respective screw 112, applied manually, for example, by means of a wrench 113 interengaged with a square end 114 of the screw 112 projecting from the lateral wall 103 along the respective axis 109 in the direction away from the plane 5. Note that the screws 112 do not project relative to the lateral wall 96 in the direction away from the plane 5, however.

A shaft 116 fastened to each of the sliders 108 near the top, along a respective transverse axis 115 parallel to the planes 5 and 196 and perpendicular to the corresponding axis 109, forms an upward projection along the axis 115 relative to the top longitudinal edges of the lateral walls 96 and 103, and the dimensions of the shafts 116 along the respective axis 115 and perpendicular to that axis are such that, by appropriately positioning the sliders 108 of each pair in the direction 106 relative to the corresponding slideway 104, they are moved on respective opposite sides of the rail 1, i.e. of the wear plate 2 and the body 3, without coming into contact with either the wear plate or the body, in the position of use of the carriage 94 shown in FIGS. 23 and 24, and so that they then have a top end at a higher level than the flats 36 but lower than that of the jaws 92 and 93, so that no part of the carriage 94 can come into contact with the supporting bracket 89 when the carriage 94 is in use.

At the same level as the axes 95, the four shafts 116 carry respective circular rollers 117 which can rotate freely about the respective axis 115, with which they are concentric, but are prevented from moving in any other way. More particularly, in the direction away from the respective axis 115, each roller has a continuous annular groove 118 concentric with the axis 115 and delimited by a circular cylindrical bottom 119 concentric with the axis 115 and by two flanks 120, 121 which diverge from the bottom 119 in the direction away from the axis 115, respectively upward and downward, with a circular frustoconical shape concentric with that axis, to a point at which they merge with a plane edge face (no reference number) of the roller 117 perpendicular to that axis. The bottom 119 of the groove 118 has a dimension parallel to the respective axis 115 substantially equal to the dimension $e_5$ of the flats 36 of the body 3 so that they can be pressed together and the flank 120 is oblique to the respective axis 115 at the same angle as that at which each beveled face 35 of the body 3 is oblique to the plane 5, for example, in the rest configuration, i.e. an angle of the order of 45° in this example, the slope of the beveled faces 35 varying only negligibly from one of the aforementioned configurations of the body 3 to the other. The slope of the flank 121 relative to the respective axis 115 can also be of the order of 45°.

Accordingly, by turning the screws 109 in the direction which moves the corresponding sliders 108 toward the plane 5, the rollers 117 can be moved into the position of use shown in FIG. 3, in which the bottoms 119 of the respective grooves 118 in the rollers of the same pair of sliders 108, which are on respective opposite sides of the plane 5 and symmetrical with each other with respect to that plane, are pressed onto a respective flat 36 of the body 3, with the flanks 120 bearing on the area of the respective beveled faces 35 directly adjacent each flat 36, at a level lower than that of the jaws 92, 93 to prevent any contact of the rollers 117 with them, so as to prevent dropping the rollers 117, and consequently the whole the carriage 94, and so that the flanks 121 bear on the body 3 at the junction between each flat 36 and the respective corresponding flat 37, so as to retain the rollers 117, and consequently the carriage 94, against any movement relative to the mounting body 3 and the rail 1 as a whole other than longitudinal movement by virtue of the rollers 117 rolling along the body 3.

The dimensions of the slideways 104, the sliders 108 and the rollers 118 are such that the sliders 108 can also be moved sufficiently far apart from the above position for the flanks 120 of the rollers 117 of the sliders 108 corresponding to the same slideway 104 to be moved apart perpendicularly to the plane 5 by a distance greater than the distance $l_{14}$ between the two flats 36, perpendicularly to the plane 5, in the rest configuration, so that the carriage 94 can be disengaged from the body 3 or interengaged with it even with the body 3 in the rest configuration, for reasons that become apparent later. Their dimensions are also such that the two sliders 108 corresponding to the same slideway 104 can be moved sufficiently far toward the plane 5 for the distance between the bottoms 119 of the corresponding grooves 118 to be at most equal to the distance $l_{10}$ between the flats 36 perpendicularly to the plane 5 in the configuration of maximum elastic flexing, in order to enable this configuration to be imparted to the body 3 by applying thrust in the direction toward the plane 5 by means of the rollers 118, by appropriately positioning the sliders 108 of each pair along the respective slideway 104 relative to the plane 5.

Note that the co-operation of the rollers 117 with the mounting body 3, regardless of the configuration of the latter in terms of the positioning of the rollers 117, i.e. the corresponding sliders 108, in the direction 106, fixes the level of the chassis 95 relative to the mounting body 3 in the direction 16 in the plane 5 and insures that the median longitudinal planes of symmetry of the carriage 94 and the mounting body 3, both of which are designated by the reference numeral 5, coincide at all times.

What is more, the bottom 97 has a threaded hole 123 through it along a transverse axis 122 defined by the intersection of the planes 5 and 196, i.e. perpendicularly to and centered relative to the bottom 97, which hole engages with a thread 124 of a coaxial screw 125 which has below the bottom 97 a square end 126 for turning it using a wrench similar to the wrench 113. The screw 125 has a top end above the bottom 97 but at a level lower than the top longitudinal edges of the lateral walls 96 and 103 and which able to rotate freely about the axis 122 but is constrained to move in translation along the axis 122 with a yoke 127 having two parallel cheeks 128 in mutually symmetrical positions with respect to the axis 122. Each cheek 128 has a rigid finger 130 attached to it, projecting away from and along a common axis 129 perpendicular to the axis 122, the finger having a respective terminal lug 131 engaged in a respective rectilinear slot 132 in the plane 196 formed in each of the lateral walls 96 and 103 and with its length in the direction 16, so that engaging the lugs 131 in the slots 132 holds the two cheeks 128 in a mutually symmetrical position with respect to the plane 5. Thus rotation of the yoke 127, and consequently of the axis 129 with it, about the axis 122 relative to the chassis 95, in particular when the screw 125 rotates relative to the chassis 95 about the axis 122, is prevented and such rotation, depending on its direction, results in movement of the yoke 127, and consequently of the axis 129 with it, relative to the rail 1 away from or toward the bottom 97 of the chassis 95 in the direction 16, and vice-versa. The pitches of the thread 124 of the screw 125 and the threaded hole 123 are preferably irreversible so that, under the normal conditions of use described later, the yoke 127 remains in the position relative to the chassis 95 of the carriage 94 and relative to the rail 1 intentionally imparted to it by rotating the screw 125 relative to the bottom 97 of the chassis 95 about the axis 122.

A roller 133 between the two cheeks 128 of the yoke 127 is journaled to both of them for rotation about the axis 129 and can rotate freely relative to the yoke 127 about the axis 129, but with no other possibility of relative movement. The roller 133 is therefore centrally located relative to the axes 115 of the rollers 117 and has in the direction away from the axis 129 a circular cylindrical outside peripheral face 134 which is concentric with the axis 129 and has a dimension in the direction perpendicular to the plane 5, and equally divided between the respective opposite sides thereof, which corresponds substantially to the width $l_6$ of the strip 6 of the wear plate 2.

Accordingly, when the carriage 94 is attached to the mounting body 3 of the rail 1, as shown in FIGS. 23 and 24, adjusting the level of the yoke 127 relative to the bottom 97 of the chassis 95 moves the roller 133 into a position in which a top generatrix perpendicular to the plane 5 of its outside peripheral face 134 bears against the strip 6 of the wear plate 2, which itself bears against the electrically conductive face 13 of the mounting body 3, without opposing longitudinal rolling of the carriage 94 along the rail 1.

However, by appropriately dimensioning the roller, the yoke 127 and the screw 125, and by adjusting the position of the roller 133 relative to the bottom 97 of the chassis 95 in the direction 16, the roller 133 can also be moved sufficiently close to the bottom 97 for the top generatrix of the outside peripheral face 134 of the roller 133 to be moved away from the face 9 of the strip 6 of the wear plate 2 in the direction 16 a distance at least equal to the depth $p_2$ of the wear plate 2. This is not shown but will be evident to the skilled person.

Of course, the mounting of the roller 133 just described is merely one non-limiting example, and other means could be chosen, in particular for guiding the yoke 127 which carries it, in the manner of a slider, relative to any form of slideway oriented in the direction 16 and attached to the chassis 95, the slideway consisting of the slots 132 in this example.

The carriage 94 can therefore be used in the following manner to renovate a rail 1 by changing its wear plate 2 without demounting the rail, and to be more precise its mounting body 3, from the support 89 first.

Initially, the rail 1 is in the state described with reference to FIGS. 7 and 21, i.e. the wear plate 2 holds the mounting body 3 in its particular intermediate elastically flexed configuration. This state of the rail 1 and this configuration of the mounting body 3 are shown in full line in FIG. 23.

A first operation consists of installing the carriage 94 on the rail 1 so that the shafts 116 are on respective opposite sides of the wear plate 2 to be changed, immediately downstream of the junction 135 of the wear plate with another wear plate 2 which is to remain in place on the mounting body 3, referred to a longitudinal direction 136 relative to which the front wall 99 carrying the attachment lug 100 for a traction member 101 of the carriage 94 and the front wall 98 are respectively at the front and at the rear.

To this end, the sliders 108 corresponding to the two slideways 104 are initially as far apart as possible and the roller 134 is lowered as far as possible toward the bottom 97 of the chassis 95. This is not shown but will be evident to the skilled person.

Accordingly, after bringing the median longitudinal plane of symmetry of the chassis 95 into coincidence with that of the rail 1, these two planes being denoted by the same reference numeral 5, by placing the whole of the carriage 94 at a level lower than that of the rail 1, and by means of an upward movement of the carriage 94, the rollers 118 can be raised in the direction 16 on respective opposite sides of the wear plate 2 and then of the body 3, until they reach the level described with reference to FIG. 23, in which the bottom 119 of the grooves 118 is directly facing one or other of the flats 36 in the direction 106. Given its initial position, the roller 134 is then separated from the wear plate 2 by a downward distance in the direction 16 at least equal to the aforementioned depth $p_2$, and preferably greater than that depth $p_2$.

Then, by turning the two screws 112 the appropriate way about the respective axis 109 relative to the chassis 95, the bottoms 119 of the respective grooves 118 of the two rollers 117 of each pair are brought into contact with the respective corresponding flats 36 and the flanks 120 of the respective grooves 118 are brought into contact with the corresponding respective beveled faces 35, so that the chassis 95 is suspended from the mounting body 3, which at this time is in its particular intermediate elastically flexed configuration, in which it retains the wear plate 2. However, the two screws 112 are turned further in the direction that causes the two sliders 108 and the respective corresponding rollers 117 to move toward each other until the body 3 reaches its maximum elastically flexed configuration, shown in dashed line in FIG. 23, which progressively releases the rims 7 of the wear plate 2 from the rebates 38 of the mounting body 3. When the body reaches its maximum elastically flexed configuration, the turning of the screws 112 is stopped. The wear plate 2 is then totally released at the location of the carriage 94 and all that is required is to apply slight traction to it in the downward direction to overcome the sticking effect of the contact grease and a tendency of the wear plate 2, which is still retained elsewhere by the mounting body 3, to remain in a generally rectilinear configuration; because of the position of the roller 134 at this time, the wear plate 2 can be locally lowered a sufficient distance, by flexing it, to disengage it entirely from the mounting body 3, at least directly to the rear of the carriage 94 in the direction 136.

Then, by pulling on the carriage 94 in the direction 136 by means of the member 101, it is moved progressively over the whole of the longitudinal dimension $L_1$ of the wear plate to move longitudinally localized areas of the mounting body 3 successively into the maximum elastically flexed configuration, which enables the corresponding longitudinally localized areas to be disengaged successively from the wear plate 2. The mounting body 3 naturally tends to revert progressively to its rest configuration to the rear of the carriage 94 referred to the direction 136, but reattachment of the wear plate 2 because of this tendency is prevented by continuing to apply sufficient traction to the wear plate in the downward direction, and to the rear of the carriage 94 referred to the direction 136, for example manually, for it to remain at a level lower than that of the mounting body 3.

The carriage 94 is caused to travel the whole of the dimension $L_1$, which corresponds more or less to the longitudinal dimension $L_2$ of a rail 1 fabricated by the method described with reference to FIGS. 1 to 22, i.e. when the faces 19 of the joints 135 between the wear plates 2 coincide with the joints 137 between the front faces 21 of the mounting bodies, progressively releasing the wear plate 2; in this connection, FIG. 4 shows rails 1 corresponding to the disposition of the wear plate 2 relative to the mounting body 3 shown in FIG. 17, it being understood that such coincidence would be obtained by adopting the relative position shown in FIG. 18.

At the end of this travel, the wear plate 2 is totally freed from the mounting body 3 of the rail 1 and the carriage 94 can be moved in the direction opposite the direction 136 to its initial position relative to the mounting body 3, for example by rolling on the latter, which returns the anchoring body 3 to its maximum elastically flexed configuration in the immediate vicinity of the aforementioned joint 135.

If necessary, the faces 40 and the rebates 38 of the mounting body 3 can then be brushed and regreased.

A longitudinal end area of a new wear plate 2 can then be inserted between the rollers 134 and the head 23 of the mounting body 3, in the direction opposite the direction 136, with its median longitudinal plane of symmetry made to coincide with that of the mounting body 3, after which the screw 125 is turned to raise the roller 133 until it returns to the position shown in FIGS. 23 and 24, in which the end area of the new wear plate can be nested over the head 23, which is retained locally by the rollers 117 in the maximum elastically flexed configuration, until the wear plate 2 occupies, locally relative to the mounting body 3, the position described with reference to FIGS. 15 to 16, i.e. with the face 10 of the central strip 6 pressed locally against the edges 50 at which each facet 39 is connected to the face 40 of the same half-head 46. This is accompanied by flexing of the wear plate 2 immediately in front of the carriage 94, referred to the direction 136, but the wear plate 2 is sufficiently flexible for this flexing not to cause plastic deformation.

After positioning the front face 19 of the new wear plate correctly in the longitudinal direction relative to the immediately following wear plate 2 on the upstream side, referred to the direction 136, in order to make the joint 135, the traction member 101 is again used to move the carriage 94 in translation in the direction 136 relative to the mounting body 3, with the rollers 117 remaining in the position in which they apply thrust to the flats 36 for moving the body 3 to its maximum elastically flexed configuration and with the roller 133 remaining in the position in which the top generatrix of its outside peripheral face 134 is at a distance at least approximately equal to the thickness $e_1$ of the central strip 6 of the wear plate 2 from the edges 50 of the half-heads 46, under the mounting body 3, which causes the face 10 of the strip 6 to be pressed against the edges 50.

As the carriage 94 moves along the mounting body 3 the rollers 117 move longitudinally localized areas of the mounting body 3 in succession in the direction 136 successively into the maximum elastically flexed configuration and the roller 134 presses localized areas of the new wear plate 2, also in succession in the direction 136, successively against the edges 50 of the half-head 46 of the mounting body 3, subject to elastic flexing of the wear plate 2 immediately in front of the carriage 94, referred to the direction 136; to the rear of the carriage 94, referred to the direction 136, the areas of the mounting body 3 that the carriage 94 successively moves away from tend to revert to the rest configuration but are retained in the predetermined intermediate configuration of maximum flexing by application of the rebates 38 to the faces 15 of the rims 7 of the wear plate 2, which presses the face 10 of the central area 6 of the latter flat against the faces 40 of the two half-heads 46, which faces 40 are then coplanar to constitute the face 13, as described with reference to FIGS. 20 and 21.

When the carriage 94 has reached the immediate vicinity of the other front face 19 of the new wear plate 2, which is not shown but will be obvious to the skilled person, the screws 112 are turned to move the rollers 117 of each pair away from each other and away from the plane 5, with the roller 133 remaining in the position which returns the mounting body 3 in this end area to its particular intermediate elastically flexed configuration, in which it retains the wear plate 2 by abutment of the two half-heads 46 against the rims 7 thereof, with the face 10 of the central area 6 of the wear plate 2 pressed flat against the face 13 of the mounting body.

When the rollers 117 of each pair are sufficiently far apart the carriage 94 can be separated from the mounting body 3, i.e. from the rail 1 reconstituted in this way.

In a variant, to change a plurality of successive wear plates, the rollers 117 can remain in the position which applies to the flats 36 of the mounting body 3 a thrust which imparts to it its maximum elastically flexed configuration when the carriage 94 reaches the immediate vicinity of the other front face 19 of the wear plate 2, and the roller 133 lowered by turning the screw 125, before further movement of the carriage 94 in the direction 136 along the immediately consecutive rail 1 in the direction 136 to separate the wear plate 2 from it in the manner previously described, prior to fitting a new wear plate 2.

Note that the carriage 94 just described, or any other equivalent device, can be used not only to renovate a rail 1 by replacing its wear plate 2, but also to fabricate a rail 1 directly on its site of use, after the various mounting bodies 3 have been fixed to their supporting brackets 89 in their final position, i.e. in a longitudinal row, and without fitting the wear plates 2 to the mounting bodies 3 beforehand.

The longitudinal sequence of wear plates 2 can easily be fitted to the longitudinal sequence of mounting bodies 3 using the carriage 94 as described hereinabove in connection with fitting a new wear plate 2 to a mounting body 3 after brushing and greasing its faces 40 and rebates 38, especially if it is made of aluminum or aluminum alloy.

In contrast to fabricating each rail 1 completely in the shop, it is possible to offset the joints 135 between two successive wear plates 2 longitudinally relative to the joints 137 between two successive mounting bodies 3, for example as shown in FIG. 24, which shows in dashed line a second position of the joint 137, so that each wear plate 2 contributes to the mechanical continuity between two successive mounting bodies 3 and any lack of alignment between the latter has no effect on the alignment of the wear plates 2, in particular in terms of the coplanar relationship of the faces 9 adapted to be in contact with the shoe 11, which reduces the wear of the latter by abrasion on passing from one wear plate 2 to the next.

Finally, the skilled person will find it obvious that the carriage 94, or an equivalent device, working on only a longitudinally localized area of the mounting body 3 and each wear plate 2 or each rail 1, can be used not only on site but also in the shop, in place of the bars 81 and their actuators 82, whose role is provided locally by the rollers 117 and the screws 112, respectively, and in place of the roller 86, whose role is provided locally by the roller 133.

The skilled person will also find it obvious that although preferred embodiments of the various aspects of the invention has been described, those embodiments can be modified in many ways without departing from the scope of the invention.

There is claimed:

1. A method of fabricating a longitudinal rail for supplying a mobile with electrical power, said rail including two electrically conductive longitudinal components which are fastened together and have respective substantially constant cross sections and a common median longitudinal plane of symmetry, namely a mounting body adapted to be mounted on a support and a wear plate which is worn by said mobile, said mounting body including, in mutually opposed positions in a transverse direction in said plane, a rigid longitudinal base for mounting it on said support and a longitudinal head for receiving said wear plate, which head is delimited in the direction away from said base in said transverse direction by an electrically conductive face straddling said plane and having a rebate in the direction away from said plane on respective opposite sides of said electrically conductive face, said plate including a flat central strip for transmitting electrical power to said mobile, straddling said plane, having opposite said base in said transverse direction a contact face for said mobile and facing toward said base in said transverse direction an electrically conductive face bearing flat on said electrically conductive face of said body and two lateral rims on respective opposite sides of said plane and forming a projection toward said base in said transverse direction relative to said central strip, each of said rims having, facing toward said plane, an attachment face for attaching it to said body, which attachment face converges with said plane in the direction away from said central strip in said transverse direction to define a hook shape interengaged with a respective rebate so that said wear plate is fastened to said head of said mounting body by a mutual nesting effect, said method including a succession of steps, the first of which consists of:

a) prefabricating separately:

said mounting body, conforming it so that said head is divided in said plane into two halves joined together by said base and delimiting between them a longitudinal slot open in the direction away from said base in said transverse direction, each of said two halves having opposite said base in said transverse direction a free end including a respective half of said electrically conductive face of said body and a respective rebate and being adapted to flex elastically relative to said base, in particular toward each other from a rest configuration in which said mounting body is prefabricated and as far as a maximum elastic flexing configuration, said two halves of said electrically conductive face of said body having an orientation relative to said plane such that they diverge from said base in said transverse direction toward said plane in said rest configuration, and said wear plate, conforming it so that its rims define between them, perpendicularly to said plane, in an area of closest approach thereto in the direction away from the central strip in said transverse direction, a width less than the maximum width of said head perpendicularly to said plane between said halves of said electrically conductive face of said body and said rebates, in said rest configuration, in which method, in step a), there are also prefabricated:

said mounting body, conforming it so that said two halves of said electrically conductive face of said body have an orientation relative to said plane such that they converge toward said base in the direction toward said plane in said maximum elastic flexing configuration and in a particular intermediate elastic flexing configuration, in which said slot is still open in the direction away from the base in said transverse direction, they are mutually coplanar and perpendicular to said plane and then constitute said electrically conductive face of said body, which is perpendicular to said plane, and said wear plate, permanently conforming it so that said contact face for the mobile and said electrically conductive face of said central strip are perpendicular to said plane and its rims define between them, perpendicularly to said plane, in an area of closest approach thereto in the direction away from said central strip in said transverse direction, a width less than the maximum width of said head, perpendicularly to said plane, between said halves of said electrically conductive face of said body and said rebates, not only in said rest configuration but also in said particular intermediate configuration, but at least equal to, and in particular greater than, the maximum width of said head perpendicular to said plane between said halves of said electrically conductive face of said body and said rebates, in said maximum elastic flexing configuration, and at least equal to, and in particular greater than, the minimum width of said head, perpendicularly to said plane, at the level of said rebates in said particular intermediate configuration, and so that said attachment faces define with said electrically conductive face of said wear plate a shape complementary to the shape that said rebates define with said electrically conductive face of said body in said particular intermediate configuration, and which method includes, after step a), the following succession of steps:

b) applying to said two halves of said head opposite thrusts to move them toward each other, perpendicular to said plane, from said rest configuration to said maximum elastic flexing configuration, c) maintaining said thrusts to retain said two halves of said head in said maximum elastic flexing configuration, nesting said wear plate over said head to place said electrically conductive face of said wear plate in bearing engagement with said halves of said electrically conductive face of said body and to place said rims on respective opposite sides of said head, facing said rebates, and d) releasing said thrusts while holding said electrically conductive face of said wear plate in bearing engagement with said halves of said electrically conductive face of said body so that said two halves of said head flex elastically toward each other, perpendicularly to said plane, and said rebates abut in this direction against said attachment faces of said rims of said wear plate, which hold said two halves of said head prestressed in elastic flexing in said particular configuration in which said two halves of said electrically conductive face of said body are also mutually coplanar and said electrically conductive face of said wear plate is therefore pressed flat against it.

2. The fabrication method claimed in claim 1 wherein said wear plate is prefabricated in one piece during step a), from a material chosen from the group comprising stainless steel, copper and copper alloys.

3. The fabrication method claimed in claim 1 wherein said mounting body is prefabricated in one piece during step a) from a material chosen from the group comprising aluminum and aluminum alloys.

4. The fabrication method claimed in claim 1 wherein, during step a), said mounting body and said wear plate are prefabricated so that said rebates and said attachment faces are plane and at the same angle to the respective corresponding half of said electrically conductive face of said body and to said electrically conductive face of said central strip whereby, at the end of step d), said rebates and said attachment faces are pressed flat together.

5. The fabrication method claimed in claim 1 wherein a contact grease is applied to at least one of said electrically conductive faces and preferably to said rebates and/or said attachment faces prior to step c), preferably immediately after or at the same time as brushing.

6. The fabrication method claimed in claim 1 wherein, during step a), said rebates and said rims of said wear plate are dimensioned in said transverse direction so that the part of each rebate farthest from said electrically conductive face of said body in said transverse direction remains disengaged from the respective corresponding rim at the end of step d).

7. The fabrication method claimed in claim 1 when applied simultaneously throughout the longitudinal dimension of said mounting body and said wear plate.

8. The fabrication method claimed in claim 1 when applied successively in longitudinally localized areas of said mounting body and said wear plate in longitudinal succession in a particular longitudinal direction.

9. The fabrication method claimed in claim 1 wherein said mounting body is fixed to said support in a particular position of use on a site on which said rail is used between steps a) and b) and wherein steps b), c) and d) are carried out with said mounting body fixed to said support in said particular position on said site.

10. The fabrication method claimed in claim 9 wherein several lengths of said mounting body are fixed to said support in said particular position on said site, between steps a) and b), by placing said lengths in alignment with each other in a longitudinal direction, and wherein steps b), c) and d) are carried out with said lengths fixed to said support in said particular position on said site using several lengths of said wear plate, aligned with each other in a longitudinal direction with the joints between them offset longitudinally relative to the joints between said lengths of said mounting body.

11. An electrically conductive longitudinal body for use in the fabrication of a longitudinal rail for supplying electrical power to a mobile, in which it constitutes a mounting body for mounting said rail on a support, said body having a substantially constant cross section and a median longitudinal plane of symmetry and including in mutually opposite positions in a transverse direction in said plane, a rigid longitudinal base for mounting it on said support and a longitudinal head for receiving a wear plate, which head has a rebate in the direction away from said plane, on respective opposite sites thereof, and is divided in said plane into two halves joined together by said base and delimiting between them a longitudinal slot open in the direction away from said base in said transverse direction, each of said two halves having opposite said base in said transverse direction a free edge including a plane edge face and a respective rebate and being adapted to flex elastically relative to said base, in particular in the direction toward each other, from a rest configuration in which said mounting body is prefabricated and as far as a maximum elastic flexing configuration, said two edge faces having an orientation relative to said plane such that they diverge from said base in the direction toward said plane in said rest configuration, in which rail said two edge faces have an orientation relative to said plane such that they converge with said base in the direction toward said plane in said maximum elastic flexing configuration and, in a particular intermediate elastic flexing configuration, in which said slot is still open in the direction away from said base in said transverse direction, they are mutually coplanar and perpendicular to said plane and together form a plane face delimiting said head in the direction away from said base in said transverse direction between said rebates.

12. The longitudinal body claimed in claim 11 when made in one piece from a material chosen from the group comprising aluminum and aluminum alloys.

13. The longitudinal body claimed in claim 11 wherein each rebate is formed by a flat facing away from said plane and progressively converging with said plane in the direction toward said base in said transverse direction, at least in said particular intermediate configuration.

14. The longitudinal body claimed in claim 11 wherein each half of said head has, between the respective edge face and the respective rebate, an edge facet facing away from said plane, connecting the respective edge face and the respective rebate, and progressively converging with said plane in the direction away from said base in said transverse direction, in particular in said maximum elastic flexing configuration.

15. The longitudinal body claimed in claim 11 wherein each half of said head includes, in the direction away from said base in said transverse direction, a rigid edge part comprising in particular the respective edge face and the respective rebate, and, between said rigid edge part and said base, an intermediate part for connecting said edge part to said base, said intermediate part defining in comparison with said base and said edge part a weakened area encouraging elastic flexing of the respective half of said head between said rest configuration and said maximum elastic flexing configuration.

16. The longitudinal body claimed in claim 15 wherein each rebate is farther from said base in said transverse direction than the connection between the respective rigid edge part and the respective elastically flexible intermediate part.

17. The longitudinal body claimed in claim 15 wherein each rigid edge part has an extension toward said base in said direction, alongside the respective elastically flexible intermediate part in the direction away from said plane and forming with it a respective longitudinal slot open toward said base in said transverse direction.

18. The longitudinal body claimed in claim 17 wherein said extension is conformed to enable an insulative cap of traditional shape to be attached to said base.

19. The longitudinal body claimed in claim 11 wherein each half of said head has, in the direction away from said plane, closer to said base than the respective rebate, a respective flat approximately parallel to said plane for applying a respective thrust toward the latter to move said half from said rest configuration to said maximum elastic flexing configuration.

20. The longitudinal body claimed in claim 19 wherein each half of said head includes, in the direction away from said base in said transverse direction, a rigid edge part comprising in particular the respective edge face and the respective rebate, and, between said rigid edge part and said base, an intermediate part for connecting said edge part to said base, said intermediate part defining in comparison with said base and said edge part a weakened area encouraging elastic flexing of the respective half of said head between said rest configuration and said maximum elastic flexing configuration, and each rigid edge part has an extension toward said base in said direction, alongside the respective elastically flexible intermediate part in the direction away from said plane and forming with it a respective longitudinal slot open toward said base in said transverse direction, and wherein said flat is on the respective extension and closer to said base in said direction than the connection between the respective rigid edge part and the respective elastically flexible intermediate part.

21. The longitudinal body claimed in claim 19 wherein said flat projects in the direction away from said plane relative to the respective adjoining areas of said body.

22. The longitudinal body claimed in claim 11 wherein each half of said head has, in the area of said slot farthest from said base in said transverse direction, an area of abutment against the other half of said head in said maximum elastic flexing configuration.

23. An electrically conductive longitudinal plate for use in the fabrication of a longitudinal rail for supplying electrical power to a mobile, in which it constitutes a wear plate of said rail which is worn by said mobile, said plate having a substantially constant cross section and a median longitudinal plane of symmetry and including a flat central strip straddling said plane, having two mutually opposite faces, and two lateral rims on respective opposite sides of said plane and projecting from the same one of said faces, having a face directed toward said plane that converges therewith in the direction away from said central strip in a transverse direction of said plane to define a hook shape, in which plate said faces of said central strip are perpendicular to said plane.

24. The longitudinal plate claimed in claim 23 when made in one piece from a material chosen from the group comprising stainless steel, copper and copper alloys.

25. The longitudinal plate claimed in claim 23 wherein said faces of said rims are plane.

26. The longitudinal plate claimed in claim 25 wherein each rim has a rectilinear longitudinal free edge delimiting the respective face in the direction away from said central strip in said transverse direction and each rim is flat and connected to said central strip by a respective longitudinal bend.

27. The longitudinal plate claimed in claim 23 wherein each rim has a rectilinear longitudinal free edge delimiting the respective face in the direction away from said central strip in said transverse direction.

28. A longitudinal rail for supplying electrical power to a mobile, said rail including two electrically conductive longitudinal components fastened together having respective substantially constant cross sections and a common median longitudinal plane of symmetry, namely a mounting body for mounting said rail on a support and a wear plate which is worn by said mobile, said mounting body including, in mutually opposed positions in a transverse direction in said plane, a rigid longitudinal base for mounting it on said support and a longitudinal head for receiving said wear plate, which head is delimited in the direction away from said base in said transverse direction by an electrically conductive face straddling said plane and having a rebate in the direction away from said plane on respective opposite sides of said electrically conductive face, said head is divided in said plane into two halves joined together by said base and delimiting between them a longitudinal slot open in the direction away from said base in said transverse direction, each of said two halves having opposite said base in said transverse direction a free end including a respective half of said electrically conductive face of said body and a respective rebate, and said wear plate including a flat central strip for transmitting electrical power to said mobile, straddling said plane, having opposite said base in said transverse direction a contact face for said mobile and facing toward said base in said transverse direction an electrically conductive face bearing flat on said electrically conductive face of said body and two lateral rims on respective opposite sides of said plane and forming a projection toward said base in said transverse direction relative to said central strip, each of said rims having, facing toward said plane, an attachment face for attaching it to said body, which attachment face converges with said plane in the direction away from said central strip in said transverse direction to define a hook shape interengaged with a respective rebate so that said wear plate is fastened to said head of said mounting body by a mutual nesting effect, and said halves of said head are held in a particular configuration prestressed in elastic flexing by said rebates bearing against said attachment faces of said wear plate in the direction away from said plane, in which rail said mounting body has a substantially constant cross section and a median longitudinal plane of symmetry and includes in mutually opposite positions in a transverse direction in said plane, a rigid longitudinal base for mounting it on said support and a longitudinal head for receiving a wear plate, which head has a rebate in the direction away from said, plane, on respective opposite sites thereof, and is divided in said plane into two halves joined together by said base and delimiting between them a longitudinal slot open in the direction away from said base in said transverse direction, each of said two halves having opposite said base in said transverse direction a free edge including a plane edge face and a respective rebate and being adapted to flex elastically relative to said base, in particular in the direction toward each other, from a rest configuration in which said mounting body is prefabricated and as far as a maximum elastic flexing configuration, said two edge faces having an orientation relative to said plane such that they diverge from said base in the direction toward said plane in said rest configuration, and said two edge faces have an orientation relative to said plane such that they converge with said base in the direction toward said plane in said maximum elastic flexing configuration and, in a particular intermediate elastic flexing configuration, in which said slot is still open in the direction away from said base in said transverse direction, they are mutually coplanar and perpendicular to said plane and together form a plane face delimiting said head in the direction away from said base in said transverse direction between said rebates, said wear plate has a substantially constant cross section and a median longitudinal plane of symmetry and includes a flat central strip straddling said plane, having two mutually opposite faces, and two lateral rims on respective opposite sides of said plane and projecting from the same one of said faces, having a face directed toward said plane that converges therewith in the direction away from said central strip in a transverse direction of said plane to define a hook shape, in which plate said faces of said central strip are plane and perpendicular to said plane, and said electrically conductive face of said mounting body and said electrically conductive face of said wear plate are plane and perpendicular to said plane and said longitudinal slot is open in the direction away from said base in said transverse direction in said particular elastic flexing prestressing configuration in which said halves of said head are retained by bearing engagement of said rebates against said attachment faces of said wear plate in the direction away from said plane.

29. The longitudinal rail claimed in claim 28 wherein said rebates and said attachment faces are plane, converge toward said plane in the direction toward said base in said transverse direction, and are pressed flat together.

30. The longitudinal rail claimed in claim 28 wherein a contact grease is disposed at least between said electrically conductive faces and preferably between said rebates and said attachment faces.

31. The longitudinal rail claimed in claim 28 wherein the part of each rebate farthest from said electrically conductive face of said body in said direction is disengaged from the respective corresponding rim of said wear plate.

32. The longitudinal rail claimed in claim 28 wherein each half of said head is adapted to flex elastically relative to said base in the direction toward said plane as far as a maximum elastic flexing configuration in which the maximum dimension of said head perpendicular to said plane between said halves of said electrically conductive face of said body and said rebates is at most equal to the width defined between said rims perpendicularly to said plane in an area of maximum closeness thereto in the direction away from said central strip in said transverse direction.

33. The longitudinal rail claimed in claim 32 wherein each half of said head has, in the area of said slot farthest from said base in said transverse direction, an area of abutment against the other half of said head in said maximum elastic flexing configuration.

34. The longitudinal rail claimed in claim 32 wherein each half of said head has, in the direction away from said plane, closer to said base than the corresponding rim of said wear plate, a respective flat approximately parallel to said plane for applying a respective thrust toward the latter in order to move said half into said maximum elastic flexing configuration.

35. The longitudinal rail claimed in claim 34 wherein each flat projects in the direction away from said plane relative to respective adjoining areas of said rail.

36. A method of renovating a rail including two electrically conductive longitudinal components fastened together having respective substantially constant cross sections and a common median longitudinal plane of symmetry, namely a mounting body for mounting said rail on a support and a wear plate which is worn by said mobile, said mounting body including, in mutually opposed positions in a transverse direction in said plane, a rigid longitudinal base for mounting it on said support and a longitudinal head for receiving said wear plate, which head is delimited in the direction away from said base in said transverse direction by an electrically conductive face straddling said plane and having a rebate in the direction away from said plane on respective opposite sides of said electrically conductive face, said head is divided in said plane into two halves joined together by said base and delimiting between them a longitudinal slot open in the direction away from said base in said transverse direction, each of said two halves having opposite said base in said transverse direction a free end including a respective half of said electrically conductive face of said body and a respective rebate, and said wear plate including a flat central strip for transmitting electrical power to said mobile, straddling said plane, having opposite said base in said transverse direction a contact face for said mobile and facing toward said base in said transverse direction an electrically conductive face bearing flat on said electrically conductive face of said body and two lateral rims on respective opposite sides of said plane and forming a projection toward said base in said transverse direction relative to said central strip, each of said rims having, facing toward said plane, an attachment face for attaching it to said body, which attachment face converges with said plane in the direction away from said central strip in said transverse direction to define a hook shape interengaged with a respective rebate so that said wear plate is fastened to said head of said mounting body by a mutual nesting effect, and said halves of said head are held in a particular configuration prestressed in elastic flexing by said rebates bearing against said attachment faces of said wear plate in the direction away from said plane, in which rail said mounting body has a substantially constant cross section and a median longitudinal plane of symmetry and includes in mutually opposite positions in a transverse direction in said plane, a rigid longitudinal base for mounting it on said support and a longitudinal head for receiving a wear plate, which head has a rebate in the direction away from said plane, on respective opposite sites thereof, and is divided in said plane into two halves joined together by said base and delimiting between them a longitudinal slot open in the direction away from said base in said transverse direction, each of said two halves having opposite said base in said transverse direction a free edge including a plane edge face and a respective rebate and being adapted to flex elastically relative to said base, in particular in the direction toward each other, from a rest configuration in which said mounting body is prefabricated and as far as a maximum elastic flexing configuration, said two edge faces having an orientation relative to said plane such that they diverge from said base in the direction toward said plane in said rest configuration, and said two edge faces have an orientation relative to said plane such that they converge with said base in the direction toward said plane in said maximum elastic flexing configuration and, in a particular intermediate elastic flexing configuration, in which said slot is still open in the direction away from said base in said transverse direction, they are mutually coplanar and perpendicular to said plane and together form a plane face delimiting said head in the direction away from said base in said transverse direction between said rebates, said wear plate has a substantially constant cross section and a median longitudinal plane of symmetry and includes a flat central strip straddling said plane, having two mutually opposite faces, and two lateral rims on respective opposite sides of said plane and projecting from the same one of said faces, having a face directed toward said plane that converges therewith in the direction away from said central strip in a transverse direction of said plane to define a hook shape, in which plate said faces of said central strip are perpendicular to said plane, and in which rail said electrically conductive face of said mounting body and said electrically conductive face of said wear plate are perpendicular to said plane and said longitudinal slot is open in the direction away from said base in said transverse direction in said particular elastic flexing prestressing configuration in which said halves of said head are retained by bearing engagement of said rebates against said attachment faces of said wear plate in the direction away from said plane and each half of said head is adapted to flex elastically relative to said base in the direction toward said plane as far as a maximum elastic flexing configuration in which the maximum dimension of said head perpendicular to said plane between said halves of said electrically conductive face of said body and said rebates is at most equal to the width defined between said rims perpendicularly to said plane in an area of maximum closeness thereto in the direction away from said central strip in said transverse direction, in which method said mounting body of said rail, whose wear plate is worn or damaged, is fixed to a support in a particular position of use on a site on which said rail is used, said method being carried out on said site with said mounting body fixed to said support in said particular position and including the following succession of steps:

e) applying to said two halves of said head opposite thrusts to move them toward each other, perpendicular to said plane, from said rest configuration to said maximum elastic flexing configuration, f) maintaining said thrust to retain said two halves of said head in said maximum elastic flexing configuration, separating said wear plate from said head to separate it from said mounting body, g) maintaining said thrust to retain said two halves of said head in said maximum elastic flexing configuration, nesting said wear plate over said head to place said electrically conductive face of said wear plate in bearing engagement with said halves of said electrically conductive face of said body and to place said rims on respective opposite sides of said head, facing said rebates, and h) releasing said thrusts while holding said electrically conductive face of said wear plate in bearing engagement with said halves of said electrically conductive face of said body so that said two halves of said head flex elastically toward each other, perpendicularly to said plane, and said rebates abut in this direction against said attachment faces of said rims of said wear plate, which hold said two halves of said head prestressed in elastic flexing in said particular configuration in which said two halves of said electrically conductive face of said body are also mutually coplanar and said electrically conductive face of said wear plate is therefore pressed flat against it.

37. The method claimed in claim 36 of renovating a rail, said method further including the following succession of steps between steps f) and g):

i) releasing said thrusts so that said two halves of said head flex elastically in the direction away from each other perpendicularly to said plane and assume a rest configuration, and j) applying said thrusts again to said two halves of said head to move them from said rest configuration to said maximum elastic flexing configuration.

38. The renovation method claimed in claim 36 when applied simultaneously throughout the longitudinal dimension of said rail.

39. The rail renovation method claimed in claim 36 when applied successively in longitudinally localized areas of said rail in longitudinal succession in a particular longitudinal direction.

40. The rail renovation method claimed in claim 36 when carried out on a site on which said rail is used, with said mounting body of said rail fixed to a support in a particular position of use and with said mounting body fixed to said support.

41. The rail renovation method claimed in claim 40 when applied to several lengths of said rail in longitudinal alignment with each other with the joints between the lengths of wear plate offset longitudinally relative to the joints between the lengths of mounting body.

42. A carriage for assembling and dismantling a longitudinal rail for supplying a mobile with electrical power, said rail including two electrically conductive longitudinal components which are fastened together and have respective substantially constant cross sections and a common median longitudinal plane of symmetry, namely a mounting body adapted to be mounted on a support and a wear plate which is worn by said mobile, when applied successively in longitudinally localized areas of said mounting body and said wear plate in longitudinal succession in a particular longitudinal direction, said mounting body including, in mutually opposed positions in a transverse direction in said plane, a rigid longitudinal base for mounting it on said support and a longitudinal head for receiving said wear plate, which head is delimited in the direction away from said base in said transverse direction by an electrically conductive face straddling said plane and having a rebate in the direction away from said plane on respective opposite sides of said electrically conductive face, said plate including a flat central strip for transmitting electrical power to said mobile, straddling said plane, having opposite said base in said transverse direction a contact face for said mobile and facing toward said base in said transverse direction an electrically conductive face bearing flat on said electrically conductive face of said body and two lateral rims on respective opposite sides of said plane and forming a projection toward said base in said transverse direction relative to said central strip, each of said rims having, facing toward said plane, an attachment face for attaching it to said body, which attachment face converges with said plane in the direction away from said central strip in said transverse direction to define a hook shape interengaged with a respective rebate so that said wear plate is fastened to said head of said mounting body by a mutual nesting effect, said method including a succession of steps, the first of which consists of:

a) prefabricating separately:

said mounting body, conforming it so that said head is divided in said plane into two halves joined together by said base and delimiting between them a longitudinal slot open in the direction away from said base in said transverse direction, each of said two halves having opposite said base in said transverse direction a free end including a respective half of said electrically conductive face of said body and a respective rebate and being adapted to flex elastically relative to said base, in particular toward each other from a rest configuration in which said mounting body is prefabricated and as far as a maximum elastic flexing configuration, said two halves of said electrically conductive face of said body having an orientation relative to said plane such that they diverge from said base in said transverse direction toward said plane in said rest configuration, and said wear plate, conforming it so that its rims define between them, perpendicularly to said plane, in an area of closest approach thereto in the direction away from the central strip in said transverse direction, a width less than the maximum width of said head perpendicularly to said plane between said halves of said electrically conductive face of said body and said rebates, in said rest configuration, in which method, in step a), there are also prefabricated:

said mounting body, conforming it so that said two halves of said electrically conductive face of said body have an orientation relative to said plane such that they converge toward said base in the direction toward said plane in said maximum elastic flexing configuration and in a particular intermediate elastic flexing configuration, in which said slot is still open in the direction away from the base in said transverse direction, they are mutually coplanar and perpendicular to said plane and then constitute said electrically conductive face of said body, which is plane and perpendicular to said plane, and said wear plate, permanently conforming it so that said contact face for v mobile and said electrically conductive face of said central strip are plane and perpendicular to said plane and its rims define between them, perpendicularly to said plane, in an area of closest approach thereto in the direction away from said central strip in said transverse direction, a width less than the maximum width of said head, perpendicularly to said plane, between said halves of said electrically conductive face of said body and said rebates, not only in said rest configuration but also in said particular intermediate configuration, but at least equal to, and in particular greater than, the maximum width of said head perpendicular to said plane between said halves of said electrically conductive face of said body and said rebates, in said maximum elastic flexing configuration, and at least equal to, and in particular greater than, the minimum width of said head, perpendicularly to said plane, at the level of said rebates in said particular intermediate configuration, and so that said attachment faces define with said electrically conductive face of said wear plate a shape complementary to the shape that said rebates define with said electrically conductive face of said body in said particular intermediate configuration, and which method includes, after step a), the following succession of steps:

b) applying to said two halves of said head opposite thrusts to move them toward each other, perpendicular to said plane, from said rest configuration to said maximum elastic flexing configuration, c) maintaining said thrust to retain said two halves of said head in said maximum elastic flexing configuration, nesting said wear plate over said head to place said electrically conductive face of said wear plate in bearing engagement with said halves of said electrically conductive face of said body and to place said rims on respective opposite sides of said head, facing said rebates, and d) releasing said thrusts while holding said electrically conductive face of said wear plate in bearing engagement with said halves of said electrically conductive face of said body so that said two halves of said head flex elastically toward each other, perpendicularly to said plane, and said rebates abut in this direction against said attachment faces of said rims of said wear plate, which hold said two halves of said head prestressed in elastic flexing in said particular configuration in which said two halves of said electrically conductive face of said body are also mutually coplanar and said electrically conductive face of said wear plate is therefore pressed flat against it, said carriage including:

a rigid chassis having a median longitudinal plane of symmetry, removable mechanical connecting means between said chassis and said mounting body in an orientation in which said median longitudinal plane of symmetry coincides with the median longitudinal plane of symmetry of said mounting body, said means supporting said chassis via said mounting body and guiding longitudinal movement of said chassis in translation relative to it, lateral thrust means on respective opposite sides of said longitudinal plane and symmetrical to each other with respect to said plane, at a level corresponding to an area of said head of said mounting body not covered by said wear plate when said rail is fabricated, means for controlled forcible movement of said lateral thrust members toward and away from said plane, perpendicularly to it, retaining their mutual symmetry, a central thrust member disposed in said plane, and means for controlled forcible movement of said central thrust member both ways in a transverse direction in said plane.

43. The carriage claimed in claim 42 wherein said mechanical connecting means are rolling means.

44. The carriage claimed in claim 42 wherein said lateral thrust members include at least one pair of rollers freely rotatable about a respective axis parallel to said transverse direction in said plane on a respective slider and said means for moving said lateral thrust members include slideways on said carriage for guiding said sliders in a direction perpendicular to said plane with no other possibility of relative movement and adjustable means for positioning said sliders along said slideways.

45. The carriage claimed in claim 44 wherein said means for adjustably positioning said sliders include a screw mounted to rotate on said chassis about an axis perpendicular to said plane, immobilized against any other movement relative to said chassis, and meshing with respective opposite threads of said sliders.

46. The carriage claimed in claim 44 wherein said lateral thrust members include two pairs of rollers, symmetrical to each other with respect to a particular transverse plane of said carriage, constituting a plane of symmetry for said central thrust member, and said means for moving said lateral thrust members constitute two respective corresponding sets which are mutually independent.

47. The carriage claimed in claim 44 wherein said mechanical connecting means are rolling means and said rolling means are said rollers of said pair.

48. The carriage claimed in claim 47 wherein, in said mounting body, said flat projects in the direction away from said plane relative to the respective adjoining areas of said body, and, in said rail, each flat projects in the direction away from said plane relative to respective adjoining areas of said rail, and each roller has an annular groove adapted to bear on a respective flat of said mounting body in areas on respective opposite sides thereof.

49. The carriage claimed in claim 42 wherein said central thrust member is a roller freely rotatable about a transverse axis on a slider and said means for moving said central thrust member include a slideway on said carriage for guiding said slider in said transverse direction with no other possibility of relative movement and means for positioning said slider adjustably along said slideway.

50. The carriage claimed in claim 49 wherein said means for adjustably positioning said slider include a screw mounted on said slider to rotate about a transverse axis of said plane, immobilized against any other movement relative to said slider, and meshing with a thread of said chassis.

* * * * *

UNITED STATES PATENT AND TRADEMARK OFFICE
CERTIFICATE OF CORRECTION

PATENT NO. : 6,536,104 B2
DATED : March 25, 2003
INVENTOR(S) : Pelletier

It is certified that error appears in the above-identified patent and that said Letters Patent is hereby corrected as shown below:

Column 38,
Line 33, after "said rebates," please insert -- not only in said rest configuration but also in said particular intermediate configuation, but at least equal to, and in particular greater than, the maximum width of said head perpendicular to said plan between said halves of said electrically conductive face of said body and said rebates, --.

Signed and Sealed this

Seventeenth Day of August, 2004

JON W. DUDAS
*Acting Director of the United States Patent and Trademark Office*